(12) United States Patent
Oleynik

(10) Patent No.: US 8,694,535 B2
(45) Date of Patent: Apr. 8, 2014

(54) SYSTEMS AND METHODS FOR RESEARCH DATABASE MANAGEMENT

(76) Inventor: Matthew Oleynik, Toronto (CA)

( * ) Notice: Subject to any disclaimer, the term of this patent is extended or adjusted under 35 U.S.C. 154(b) by 291 days.

(21) Appl. No.: 13/256,650

(22) PCT Filed: Mar. 19, 2010

(86) PCT No.: PCT/CA2010/000405
§ 371 (c)(1),
(2), (4) Date: Sep. 15, 2011

(87) PCT Pub. No.: WO2010/108261
PCT Pub. Date: Sep. 30, 2010

(65) Prior Publication Data
US 2012/0005232 A1   Jan. 5, 2012

Related U.S. Application Data

(60) Provisional application No. 61/162,256, filed on Mar. 21, 2009.

(51) Int. Cl.
*G06F 17/30* (2006.01)

(52) U.S. Cl.
USPC .......................... 707/769; 707/792; 707/736

(58) Field of Classification Search
USPC .......................... 707/736, 769, 770, 771, 792
See application file for complete search history.

(56) References Cited

U.S. PATENT DOCUMENTS 7,792,685 B2 * 9/2010 Andino et al. ............... 705/1.1
8,121,410 B2 * 2/2012 Yanagisawa et al. ......... 382/181
2007/0088679 A1 * 4/2007 Heffler .............................. 707/3
2007/0094285 A1 * 4/2007 Agichtein et al. ............ 707/101
2008/0133490 A1   6/2008 Sacco
2009/0070200 A1 * 3/2009 August ........................ 705/10
2009/0150386 A1 * 6/2009 Lichtblau .......................... 707/5
2009/0177628 A1 * 7/2009 Yanagisawa et al. ........... 707/3

FOREIGN PATENT DOCUMENTS

| CA | 2514165 A1 | 1/2007 |
| GB | 2439843 A | 1/2008 |
| WO | 2006036127 A1 | 4/2006 |
| WO | 2008074160 A1 | 6/2008 |

OTHER PUBLICATIONS

Sacco, "Uniform access to multimedia information bases through dynamic taxonomies", IEEE Proceedings of Sixth International Symposium on Multimedia Software Engineering, 2004, pp. 320-328.

(Continued)

*Primary Examiner* — Cheryl Lewis
(74) *Attorney, Agent, or Firm* — Manelli Selter PLLC;; Edward J. Stemberger

(57) ABSTRACT

A computing device includes a processor for receiving data pertaining to a plurality of different items of content. The data for each different item of content including at least one identifier for at least one premise pertaining to the item of content selected from a taxonomy of premises, and including at least one identifier for at least one conclusion pertaining to the item of content. The conclusion is based on the selected premises. A database includes the data pertaining to the plurality of different items of content. The database is searchable upon receipt of a search request based on one or more of the premises. Upon the search request, the processor is constructed and arranged to generate a set of records from the database containing the premises in the search request and generating a set of intersections of conclusions within the database that are based on the set of records.

20 Claims, 12 Drawing Sheets

(56) References Cited

OTHER PUBLICATIONS

Saelee et al., "A Metadata Search Approach to Keyword Search in Relational Databases", Third International Conference on Convergence and Hybrid Information Technology, Nov. 2008, pp. 571-576.
Esudeiro et al., "Exploring HTML Tags and Metadata to Improve the Expressiveness of Web Search Engine's Queries", Second International Conference on Computer and Electrical Engineering, Dec. 2009, pp. 569-573.

Ismail et al. "A Metadata Taxonomy to Support Semantic Searching Algorithms in Metadata Repository", International Conference on Electrical Engineering and Informatics, vol. 2, pp. 1-6, Aug. 2009.
Wang et al, "A Semantic Faceted Search With Rule-based Inference" Proceedings of the International MultiConference of Engineers and Computer Scientist, vol. 1, Mar. 18-20, 2009.
International Search Report and Written Opinion in PCT/CA2010/000405; dated May 27, 2010.

\* cited by examiner rangefinder has selections | category
--- | ---
● | Accused
 | Record
 | Pre-Sentence Behaviour
● | Complainant
 | Offence
● | Procedure
 | Pre-Sentence Custody/Release
● | Sentence
● | Conditions
● | Judgment home | about | contact | settings | news | log off | help ☐ Aboriginal
  ☐ Gladue report
  ☐ No Gladue report
☐ Abuse victim
☒ Addiction: Alcohol
☐ Addiction: Drugs
☐ Addiction: Gambling
☐ Age: Elderly
☒ Age: Young adult
☐ Age: Young person
☐ Amenable to counselling
☐ Contemptuous of proceedings
☐ Corporation
☐ Custody dangerous for accused
☐ Informer
☐ Pedophile ☐ Depression
☐ Manic depression
☐ Menstrual/Menopausal
☐ Suicidal
☒ Disadvantaged background
☐ Dupe
☐ Family disintegration
☒ Family responsibilities
☐ Single parent
☐ Sole financial provider
☐ Supports disabled relative
☐ Family support
☐ Female
☐ Pregnant
☐ Financial difficulties
☐ Good character ☐ Good reputation
☐ Good academic record
☐ Good work record
☐ High risk of re-offence
☒ Low risk of re-offence
☐ Unlawfully in Canada
  ☐ Previously deported
☐ Incorrigible
☒ Indigent
☐ Injured due to offence
☐ Insight into conduct
☐ No insight into conduct
☐ Judge or other court officer
☐ Lawyer
☐ Letters of support
☐ Likely to benefit from treatment ◄ Previous   Next ►

Clear all

Discharges: △ 0
Fines: △ 2
Probation: △ 3
Conditional Sentences: △ 11

Intermittent Sentences: △ 37
Imprisonment: △ 15
   Show Duration

68 cases match these tags show me these cases △

Fig. 3 rangefinder — 127

Sort by: most recent | highest punishment | lowest punishment | judge | level of court home | about | contact | settings | news | help
Print   Save
— 128
log off > Show tags Associated with this case — 130

R. v. Gretzky — 129

- date: 1 January 1998
- Judge(s): Apollo, Aphrodite, Hermes
- province: Ontario
- court: Ontario Court of Justice — 131

Offence(s) — 132
- drunk driving
- kidnapping
- assault
- theft

Citations — 135
- 1998 ONCJ 554
- 1998 CarswellOnt 542
- [1998] O.J No 332
- 355 C.C.C (3d) 215

Sentencing — 133
| | |
|---|---|
| | 6 months |
| | 20 years |
| | 6 years |
| | 4 years |
| Total Sentence | 30.5 years | — 134

| 112 O.R. 15 | 355 C.C.C (3d) 215 |
| 44 D.L.R. (4th) 385 | 37 C.R. (6th) 1 |
| 1998 ONCJ 554 | 112 O.R. 15 |
| 1998 CarswellOnt 542 | 44 D.L.R. (4th) 385 |

▽ download this case from
> CanLII
> CourtWebsite
> Quicklaw
> Legal ABC
> Canada Law
> CanLegal
— 136

◀ | 1 | 2 | 3 | 4 | ▶   — 137

▲ R. v. Howe — 140

- date: 1 January 1998
- Judge(s): Apollo, Aphrodite, Hermes
- province: Ontario
- court: Ontario Court of Justice Offence(s) — 138
- drunk driving
- kidnapping Sentencing
- 6 months
- 20 years ▽ download this case from
> CanLII
> CourtWebsite
> Quicklaw
> Legal ABC
> Canada Law
> CanLegal ▽ alter this search    start new search △ — 139

Fig. 4

SYSTEMS AND METHODS FOR RESEARCH DATABASE MANAGEMENT

PRIORITY CLAIM

The present specification claims priority from U.S. provisional patent application 61/162,256 file Mar. 21, 2009, the contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The present specification relates generally to computing devices and more specifically relates to systems and methods for research database management.

BACKGROUND

Research tools are plentiful. However, such tools are typically limited to text-string searching. Reliance is generally then placed on the search tool's ability to locate the text-string (or Boolean expression). In such scenarios there is often little intelligence, or intelligence comes with a price—requiring great computational power or significant time. As the amount of content to be searched grows, such problems become even more pronounced. Further, as content grows, requirements for storing the content become large and unwieldy.

SUMMARY OF THE INVENTION

In one aspect of the present specification there is a system for tag based research comprising a system provider configured to communicate tag based research data with one or more users. The tag based research data may comprise at least one of content or classification data.

In a further aspect of the present specification there is a system for tag based—research comprising a system provider configured to allow search for content based on its classification. The system provider may be configured to communicate tag based research data. The tag based research data may comprise at least one of one or more tags. The system may further comprise a communication network configured to allow communication between the system provider and various computing devices.

In another aspect, the present specification comprises a method for making pieces of content tag-based researchable comprising devising one or more taxonomies of tags to classify for one or more pieces of content, determining the relevant tags for at least one of the one or more pieces of content, and associating the relevant tags for each of the at least one of the one or more pieces of content with each of the at least one of the one or more pieces of content.

The step of associating may further comprise allowing the one or more pieces of content to be searched for based on the relevant tags for each of the one or more pieces of content. The step of associating may further comprise altering the content to append the relevant tags to the content. The step of associating may further comprise altering the content by inserting tags, such as hyper-text markup language (HTML) tags, into the content. The step of associating may further comprise creating one or more databases that store identifiers of the one or more pieces of content and the relevant tags for each content identifier.

In another aspect, the present invention comprises a method for tag based research comprising classifying one or more pieces of content, searching for content based on its classification, and reviewing content based on its classification.

The step of classifying may further comprise creating one or more taxonomies of tags for at least one of a group of content, and determining, for each tag and each piece of content, whether each tag is relevant to the piece of content.

The step of classifying may further comprise reviewing one or more pieces of content, separating the one or more pieces of content into one or more groups of content, and storing data for each piece of content that relates what tag applies to the piece of content.

The step of storing data further comprises appending the one or more tags to the piece of content.

The step of searching further comprises specifying tags that are desired to be relevant for the content that is desired and querying one or more pieces of content to see if the specified tags are relevant tags for the content.

The step of reviewing further comprises obtaining one or more content identifiers and selecting a content identifier to receive the content.

In a further aspect of the present specification there is a machine readable medium having recorded thereon instructions for execution by one or more computing devices for causing the one or more computing devices to implement any of the methods herein described. Such computing devices may receive data signals to be used in conjunction with the recorded instructions to implement any of the methods herein described. Such data signals may be received from the one or more computing devices or a second one or more computing devices.

In a further aspect of the present specification there is a medium embodying a data signal representing sequences of instructions which, when received and executed by one or more computing devices, cause the one or more computing devices to carry out any of the methods herein described. Such computing devices may receive one or more second data signals to be used in conjunction with the sequences of instructions to implement any of the methods herein described. Such second data signals may be received from the one or more computing devices or a second one or more computing devices.

An aspect of this specification provides a method for research database management comprising:
  receiving at a processor a first set of identifiers for a plurality of different content;
  receiving at said processor a second set of identifiers for said plurality of content; the second set of identifiers associated with the first set of identifiers within each content;
  generating a database comprising said plurality of different content, said first set of identifiers and said second set of identifiers; said database searchable upon receipt of a search request based on one or more of said first set of identifiers in order to generate a set of intersections of said second set of identifiers.

The first set of identifiers can be premises.

The second set of identifiers can be conclusions drawn from said premises.

The content may comprises one of legal decisions, business case studies, pharmacological studies, psychological studies, or social science studies.

The content may be in HTML format. The first set of identifiers may be HTML tags.

The second set of identifiers may be HTML metadata.

The method may further comprise, or a stand alone method may comprise:

receiving a search request comprising one or more of said first set of identifiers;

determining an intersection of one or more of said plurality of different content based on said second set of identifiers and said first set of identifiers;

controlling a display to generate a report of said intersection.

The report may comprise intersections based on one or more of said second set of identifiers.

The method may further comprising receiving a selection of one or more of said plurality of content within said intersection and controlling said display to generate said selection.

Another aspect of the specification provides a computing device configured according to any foregoing method.

Another aspect of the specification provides a system comprising a plurality of computing devices connected by a network wherein each of said computing devices is configured to perform at least a portion of any foregoing method.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is an embodiment of screens for tag-based research generated by a processor.

FIG. 4 is an embodiment of screens for tag-based research generated by a processor.

DETAILED DESCRIPTION OF THE INVENTION

Figure 1:
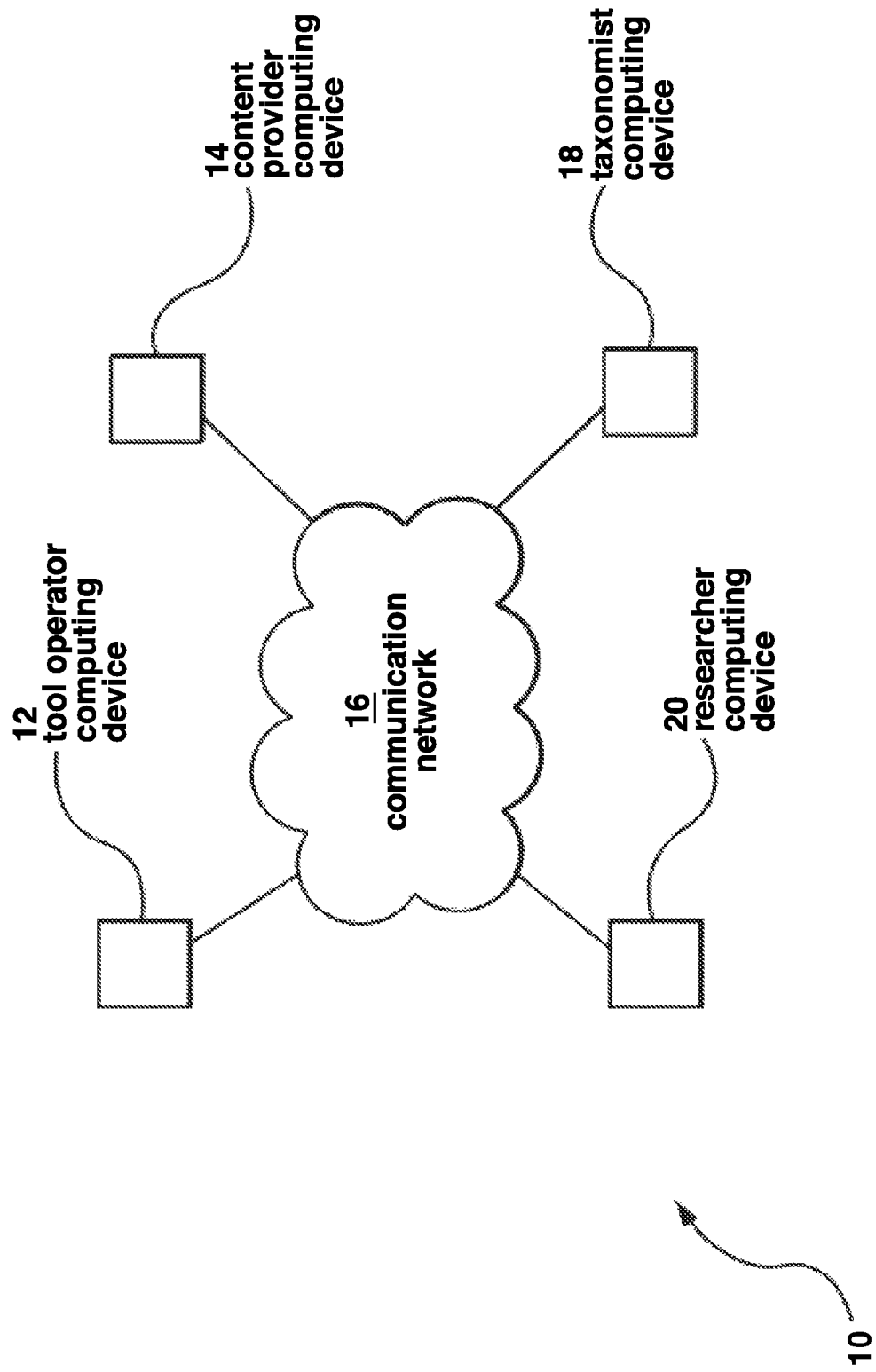
FIG. 1 is a diagram of an example of a system.

A few terms and concepts that will be used throughout this specification will be described prior to referring to examples and figures.

Tags

"Metadata" are data that describe a document or item, but that are not actually the data within the document or item (or do not form the substantive or visible data in the content, such as HTML tags, for example). For example, the metadata of this document might include the size of the margins, the date it was created, or the font. Tags are non-exclusive packages of metadata (i.e., the application of one tag does not prevent the application of any other tag). Each tag is a descriptor that is either applied or not applied to a particular record. Both a tag's presence and its absence convey information about the record.

Tags need not necessarily be inserted or appended to the content they are describing. In one embodiment, tags may be stored or associated with content identifiers, and such content identifiers may allow access to the underlying content. In one such embodiment, a database may store content identifiers such as titles or record numbers and the tags that apply, or are relevant to, that content. The content identifier may further be a link to one or more sources of the underlying content.

An example of tags may be social networking websites, such as Facebook (Trademark), where the photo gallery allows tagging of photos with the identity of the persons depicted in them. When a person is tagged as being in the photo (such as John Smith being in the photo) then a piece of data is associated with that photo, the piece of data representing the presence of John Smith. In such an example, the absence of a tag likely means little (as there may be millions of people, most of them not being in the particular photo), but still does convey that John Smith isn't in the photo. In this example, the tags describe only the people in the photo. However, tags can describe any aspect of the record such as, in this example, when or why a photo was created, the type of camera used to take the picture, the moods of the persons in the photo, or any other metadata.

Tags are selected from a predetermined taxonomy as described herein. The taxonomy is often mutable, but need not be so.

Tag Taxonomy

A tag taxonomy may be a set of tags that are deemed to be relevant to particular content, type of content, or group of content. A tag taxonomy may be one or more tags that may be used to classify such content, type of content or group of content. It is to be understood that content and a piece of content will be used substantially interchangeably herein. Generally each piece of content may have quantities of content; each group, type, or collection of content may be made up of one or more pieces of content.

Exemplary content may be one or more areas of law (such as criminal sentencing, spousal support family law orders, judgments decided in a particular U.S. state, judgments containing any international aspect, etc.), photographs, business cases, newspaper articles, medicine (such as diseases having one or more tags of symptoms which may be searched based on symptoms to arrive at potential diagnoses), and the like.

Creation of the taxonomy for any at least one piece of content may be effected via tool operator computing device 12, taxonomist computing device 18, or other computing device, to reflect how a particular hierarchy of identifiers arises from a given set of content, such as the area of law, is to be categorized.

The taxonomy may restrict and normalize the manner in which the researcher can express her professional interpretation of a judgment by only permitting her to select from a predetermined list of tags. In other words, the researcher's professional interpretation on any particular point may be reduced to a binary decision: does the tag apply or not? The taxonomy may also include some aspects of flexibility to allow addition or suggestion of tags for a taxonomy or content.

The taxonomy may also restrict and normalize the queries permitted computing device 20. For example, queries may be restricted in the system to selection of a set of tags and requesting that the application return results that match the selected set. The taxonomy is mutable and can be altered via processes put in place by the tool operator; for example, the taxonomy may change based on suggestion that a tag be split into two tags, or that a particular tag is unhelpful and should be removed. An example tag taxonomy (relating to criminal sentencing law) is included below:

| Tag ID | Weight | Tag name | Sub tag 1 |
|---|---|---|---|
| | | ACCUSED | |
| 1000 | 4 | Aboriginal | |
| 1033 | | | Gladue report |
| 1066 | | | No Gladue report |
| 1100 | 1 | Abuse victim | |
| 1200 | 2 | Addiction: Alcohol | |
| 1300 | 2 | Addiction: Drugs | |
| | | RECORD | |
| 11100 | | | |
| 11200 | 3 | Dated (gap) | |
| 11300 | | | 1-3 years since last offence |
| 11600 | | | 10 or more years since last offence |
| 11700 | | | Treated as first offender |
| 11800 | 3 | History of disobeying court orders | |
| 11900 | 4 | History of impaired driving, blowing over etc. | |
| | | COMPLAINANT | |
| 15100 | 4 | Accused's child | |
| 15400 | 5 | Accused's romantic partner | |
| 15500 | | | Accused's spouse |
| 15600 | 1 | Bar employee | |
| 15700 | 5 | Child | |
| 15800 | | | Infant |
| 15900 | | | Age: 10 and under |
| 16000 | | | Age: 11-14 |

It is to be understood that different tag taxonomies for a particular type of content and further input tags for a particular content in that type may be created and may differ. Alternatively, a taxonomy may be created, but then subsequent dynamic flexible programming can be provided so that tags under that taxonomy are dynamically created or dynamically changeable.

Tag/Taxonomy/Tag Set Example

To illustrate the use of tags and taxonomies, a simple example is described here. For the purposes of this example, we will envision a tag taxonomy with six tags, named Tag1 through Tag6. We also imagine three documents, Document A, Document B, and Document C. Such an example indicates that for a particular group or type of content (that includes at least documents A, B and C) there are six tags with which to classify the documents. Of course it is to be understood that the six tags may not exhaustively classify the documents (a true system might have hundreds or thousands of tags and millions of documents), the number of tags may shrink or grow depending on such factors as their use and the sophistication of the taxonomy and taxonomist computing device 18.

The documents have tags applied to them as follows:
Document A: Tag1, Tag2
Document B: Tag4, Tag5, Tag6
Document C: Tag1, Tag2, Tag6

The sets of tags represent the interpretation of the documents by the person who applied the tags, such as tagger computing device 18. The sets of associated tags can be represented graphically as follows (with boldface representing association):

Document A: Tag1 Tag2 Tag3 Tag4 Tag5 Tag6
Document B: Tag1 Tag2 Tag3 Tag4 Tag5 Tag6
Document C: Tag1 Tag2 Tag3 Tag4 Tag5 Tag6

The association of tags to each document has created a "fingerprint" for each document that can be searched by database query, the creation occurring for example in database 66 using tagger module 56. Researcher computing device 20 searching for documents containing Tag1 and Tag2 would find Documents A and C (such as via a simple SQL query or another similar search). Researcher computing device 20 searching for Tag6 would find Documents B and C.

Researcher computing device 20 searching only for Tag3 would find nothing. (Note that a set of tags is not unique to a particular document, but can be repeated if two documents are substantially similar.)

The use of tags means that the database being searched, such as database 66 using module 54 contains only sets of tags describing the documents rather than the documents' contents, which may increase search efficiency, speed, and accuracy. Indeed, the database may be entirely ignorant and independent of the contents of the documents.

Exemplary Use of Tags/TBRT for Legal Content (Tag Based Legal Research)

Prior to referring to the figures, an example will be provided of the use of the tag based research tool ("TBRT") for legal content. Tag based legal research ("TBLR") involves using TBRT for legal research of judgments (in the sense of written judgments of the court) or other documents. Judgments will be read by a researcher who will select tags that describe relevant metadata from a predetermined taxonomy of tags (that may have been established by a tagger computing device 18). The TBLR tool would then allow locating of judgments that matched particular combinations ("sets") of tags.

This example TBLR product is a sentencing research tool that may be called "Rangefinder." During the penalty phase of criminal law proceedings, modern courts give a great deal of attention to the proper "range" of sentence available on a certain set of facts.

This range is deduced from previous cases that match the instant case in relevant ways. The factors considered by the court in sentencing (as in 99 per cent of other types of adjudication) are predictable and recurrent. In Rangefinder, tagger computing device 18 would read a judgment and input his professional interpretation into the Rangefinder database in the form of tags. For example: the sentencing judgment of *R. v. Smith* is reported. It involves a computing device 20-year-old man who committed an assault during a bar fight. The man had a steady job and no criminal record, and had pleaded guilty. However, he stated in a pre-sentence interview with a social worker that the complainant he assaulted had "asked for it," and that the assault was his (the complainant's) own fault. The social worker's report indicated that the man would commit the same offence in future if confronted with the same circumstances. The man was subject to a release recognizance for three months and obeyed his release conditions. The complainant did not attend the sentencing hearing and there was no evidence about the extent of his injuries, if any. The sentencing judge gave Mr. Smith a conditional discharge with a noncontact condition (not to contact the complainant) and requiring him to take anger counseling. The judge wrote, "Although Mr. Smith's conduct was inexcusable, I find it more important to ensure that it does not repeat than to punish him unduly.

Tagger computing device 18 may first label this judgment with its obvious metadata: the judgment name, date of judgment, jurisdiction (location), level of court, judge's name, and charges. Then she could apply the following tags (though more or less could also be applied, as described herein):

Accused: Young adult
Accused: Not remorseful
Accused: Blames complainant
Accused: Good release behaviour
Accused: Negative pre-sentence report
Complainant: No Victim Impact Statement
Record: No criminal record
Assault: Fight
Sentence: Conditional discharge
Conditions: Non-contact
Conditions: Counselling
Judgment: Emphasizes rehabilitation When computing device 20 logging into rangefinder via computer computing device 20, a researcher may be confronted with a list of tags broken into categories (Accused, Complainant, etc.) per the taxonomy that was initially created (for example by tool operator 12 or taxonomist computing device 18). He can click on tags and the application will return judgments that contain the same combination. This permits the researcher to come at his research any way he wishes: if he wants to select tags that match a particular situation (such as his client's) he can find judgments with similar facts and discern the traditional sentence range. If he wants to see what sentence, in general, is given for assault charges arising from fights, he can. If he wants only judgments in which young adults receive conditional sentences, or judgments in which conditional sentences are given to first offenders who plead guilty, he can. He may also wish to see judgments in which the court speaks about rehabilitation while sentencing young adults. With an understanding of the system and the tag taxonomy, these tasks are trivial.

A more general description of embodiments of the invention, and further particular examples, will be described through reference to the figures.

FIG. 1 is a diagram of an embodiment of a system according to the invention. System 10 comprises tool operator computing device 12 (also referred to as system provider computing device 12), content provider computing device 14, communication network 16, taxonomist computing device 18 (which may be referred to as tagger computing device 18), and researcher computing device 20.

As used herein, computing device may be an electronic hardware component that may be able to communicate with other computing devices, such as via communication network 16. A computing device may include, but is not limited to, personal computers (PC), server computers, laptop computers, Personal Digital Assistants (PDA), computer terminals, cellular telephones, and smart phones. Computing devices may further comprise one or more peripheral devices such as scanners, printers, bar-code readers, Bluetooth or other receivers, or imaging devices. Computing devices may allow downloading web pages, such as from web server 50 and may allow interacting with the TBRT through these webpages. Computing devices may also store information such as settings and preferences in cookie files. Finally, they can use their own storage and drivers to save and print content retrieved via the tool, or lists of content (search results).

System 10 may provide a tag-based research tool (TBRT). System 10 may be substantially computerized and electronic. System 10 may provide a method of classifying, quantifying, and/or capturing professional interpretations of content (such as legal judgments, scientific journals, business cases for example through the use of taxonomies and tags); performing computer aggregation and analysis on that data; searching the database per end-user computing device 20 request; and delivering the data and the results of the aggregation and analysis to end-user computing device 20.

System 10 may allow end-user computing device 20 to receive automated feedback to their research queries and may eliminate false positives and false negatives from the results of those queries. It may also allow researchers computing device 20 to interact with the data in a manner determined by tool operator computing device 12.

Such classifying, quantifying, and/or capturing, and the elimination of false positives and negatives, may increase the efficiency of searching by obviating the need for sophisticated searchers who, in other systems, may require sophisticated topical or substantive knowledge to construct meaningful searches and determine whether the searches have produced the desired results.

Researcher computing device 20 may be able to add to, alter, or remove from the dataset to increase its accuracy and scope. Content may or may not all be stored by tool operator computing device 12, which may require fewer resources to accomplish these benefits than current research tools.

In one embodiment, system 10 may replace or augment text-string (Boolean) searching in legal research. System 10 may allow computing device 20 to find relevant documents quickly and accurately by selecting sets of descriptors ("tags").

System 10 may provide feedback to computing device 20 during the research process and generate results. Such results may contain no false positives and omit no false negatives (providing that no false positives or false negatives were put into system 10 as a result of specifying that particular tags are relevant to particular content when in fact they are not). Such feedback may include content as results, content identifiers, and links to content.

Such feedback may further include feedback obtained by processing the results. By way of example, upon selection and deselection of tags, those changes could be applied in real time and update either a visible list of results on the screen or provide another form of feedback such as the number of matching judgments or even (in the example of the sentencing tool given above) the average sentence range contained in the matching judgments, updating with each click. Medical diagnoses may change as different symptoms are selected or deselected.

The following are additional aspects of the present invention that may be implemented, for example, by system 10 and tool operator computing device 12:

Advertising

Various advertisements may be inserted into aspects of the screens (as shown and described herein). Further, if content identifiers are used as links to content hosted by one or more content providers computing device 14, then content providers computing device 14 may provide advertising fees for system 10 to direct traffic to content provider's computing device 14 content as opposed to the same content hosted by another content provider computing device 14 or even to place it as the first choice, or to draw attention to it in a graphical or other manner. More traditional advertising could also be interpolated with the content of the site (banners, textual ads, etc.).

Portability

Each area, group, type, or collection of content may require its own taxonomy and database of professional interpretation. However, the architecture of the tool, its interfaces, and its processes are content-agnostic. The expense of re-development for each area of law or other content is low and the TBRT may allow for content-type experts (who may or may not be familiar with the TBRT or associated with tool operator computing device 12) to exercise their judgment and professional interpretation.

Content Types/Groups and Branding

The operator of the TBRT tool may re-brand (via colour schemes, graphics, textual indicators, etc.) the interfaces relating to different content types such as areas of law. This may communicate that a product is specifically geared toward the area of law or content of interest. The TBRT has the potential to generate more goodwill by selling access to individual databases rather than by restricting access to limited, pay-only areas of a monolithic product.

Automatic Notices

The TBRT tool can easily be programmed to remember particular tag sets or groups of tags and monitor one or more databases for changes to the results of searches run with those sets. System 10 may then notify an end-user or group of end-users if the results of a particular search changes (such as by sending an email or short message service (SMS) message to indicate or provide a new piece of content that has been added to the results). This might be useful, for example, for a lawyer dealing with a highly specialized type of practice. He or she could be notified whenever any judgment tagged with a particular tag set was added to the database. This could also allow a doctor to stay up to date on particular research, for example, for treatments for heart disease.

TBRT may allow purposefully imprecise ("fuzzy") searching by running searches in parallel with those actually input by the end-user and suggesting results from those result stacks. For example, the end-user might create a tag set of fifteen tags and receive several results (of pieces of content), and the tool might run a parallel search of the same set but with one of the tags replaced by another. The TBRT may then suggest those results to the user. This would be even more useful if the operator has included in the tag taxonomy a measure of the importance of particular tags to the search results. For example, if a tag was rated as being of low importance, the tool would be more likely to replace it in parallel searches and suggest those results than if the tag was rated as being highly important.

Most Impactful Content

The tag taxonomy and data schemata can form the basis of other products that utilize and present the stored data, and calculations or processing arising from the stored data, in different ways. One example might be a product that highlights the tags that make the most difference in the outcomes of the judgments in the results. In the sentencing tool example above, the end-user might construct a tag set describing a particular fact situation and then request that the tool indicate which tags had the most influence on the average sentence in judgments in the results. In this example, the tool might highlight the factors that it would may be important for the end-user to focus on and which are unlikely to have much effect.

Faster/Less Computationally Expensive

When researcher submits a request to the TBRT or system 10, system 10 may not require searching the full text of any content, but may instead require only the querying of database tables to determine which tags apply or are relevant to a given record/content/content identifier or what records are associated with a particular tag. This may be faster than a full-text scan of every piece of content in the searched database as it contains less data.

New Interface Options

The increased speed of TBRT searches allow for new methods of displaying data to the end-user. For example, as an end-user selects and deselects tags, the interface (such as the user screens as described herein) could apply those changes in real time and update either a visible list of results on one or more user screens or provide another form of feedback such as the number of matching results or even (in the example of the sentencing tool given above) the average sentence range contained in the matching judgments, updating with each click.

Less Storage Required

Since TBRT does not require the scanning of full text, the actual content (such as text of a judgment) does not need to reside on the tool operator's computing device 12 servers. The operator need only maintain a database of which tags are associated with which record/content identifier/content. Due to the absence of the need to host or search large amounts of text, the hardware requirements of TBRT may be less onerous and cheaper than those required by full-text searching.

Reduced Cost to Operator

The technical overhead cost of running a TBRT may be less than the cost of running a full-text searching tool with a similar scope. The hardware required to host the database and run the queries may be a fraction of the hardware required to host the text of every piece of content within the tool's scope and search their full-text with every query.

Potential for User Contribution

Tags could be suggested for particular content or judgments or, in the case of a trusted user base, applied directly. The entire process of content tagging could be accomplished socially. This harnesses user experience and knowledge that would be lost in a system with which the user cannot interact in this way.

Conversational Searching

System 10 may provide a different search context. The use of a taxonomy to guide the end-user's research may promote a conversational approach to research, and may allow the user or researcher to experience instant feedback.

System 10 may do so by atomizing the search experience: in a text-based search, the end-user receives feedback after the search term has been constructed and submitted, while in TBRT the user may receive feedback after the smallest possible unit of interaction with the tool (a single click).

Extending the example given above, the end-user wishes to locate cases in which a conditional sentence was given for a particular offence (assault) in a version of the TBRT tool specialized for criminal law sentencing research. The TBRT tool displays a count of the number of judgments in the result stack and how many of each type of punishment is contained therein.

Conditional Sentence and then Assault is selected. The tool queries database after each click and discovers that there are 872 judgments within the scope of the database associated with both tags, all of which have the punishment of a conditional sentence applied. The tool displays this number, as well as displaying the punishments in those judgments (in this case all conditional sentences). Noting that this number of judgments is unmanageable, the end-user selects Accused: Young Adult and see the judgment court fall to 104, and then clicks Assault: Consensual Fight, which brings the count to 33. She believes this to be a manageable number. Before she requests the results, however, she deselects Conditional Sentence. The tool now displays all judgments in which a young adult accused was sentenced for a consensual fight assault. The judgment count increases, and the tool also displays forms of punishment other than a conditional sentence in the result stack. The end user mentally assesses this output and then re-selects Conditional Sentence and clicks on the control that displays the result stack. Later, she may click the control that allows her to return to the tag-select screen, deselect "Conditional Sentence," select "Conditional Sentence Requested but Denied" and compare the punishments to those listed in her previous results.

With only ten clicks, including those involved in navigation (showing the result stack or returning to the tag-selection screen), the end-user has learned the following:

Assessing all judgments that contain a conditional sentence being applied for an assault is an inefficient research tactic in this case, even if the search is further narrowed to those involving a young adult accused.

The dispersion of punishment types in judgments involving young adults convicted of assault in consensual fights.

How many judgments exist in a relevant result stack that is narrow enough to be manageable.

Data about the judgments themselves: how to retrieve them, what jurisdiction they come from, what level of court issued them, the judges who authored them, their dates of issue, and places at which she can access them. (This information may be available on the results page, as described herein with respect to user screens)

The dispersion of punishment types in judgments involving young adults convicted of assault in consensual fights where a conditional sentence was considered but rejected.

Rather than executing a full-text search and leaving her to pick through the results, the TBRT has put the end-user in a powerful position to survey the data relevant to her interests and determine what is important as she searches. The end-user may have the option to refine or maintain her search strategy after every click. The tool also encourages her to have back-and-forth communication with the tool, rarefying and narrowing her search until it meets her criteria for a useful result.

Tool operator computing device 12 may provide much of, or substantially all of, the functionality of system 10 as described herein. Tool operator computing device 12 may provide the functionality for one or more of content provider computing device 14, taxonomist computing device 18, and researcher computing device 20 to operate as described herein.

Tool operator computing device 12 may be an operated by individual or a company. Tool operator computing device 12 may host one or more software modules configured to enable many tasks relating to assembling and/or producing finished goods. Tool operator computing device 12 may have one or more modules and sub-modules (as described herein) to facilitate these, and other, tasks. It is to be understood that although one or more exemplary embodiments of various modules are described herein, any number of modules could be used and any module could offer different combinations of functionality. Further, although tool operator computing device 12 is shown in FIG. 1 as being in one location, tool operator computing device 12 may have one or more locations, each of which could be remote or local with respect to researcher computing device 20 or tagger computing device 18.

Tool operator computing device 12 need not be accessed only via web-capable devices and over network 16. Other embodiments of the present invention consider alternative methods of access, for example that still allow tags to be communicated.

In one such embodiment computing device 20 could be used to compose an e-mail, using a textual form, and send the e-mail to a mail server connected to tool operator computing device 12. The e-mail could be interpreted to submit a translated set of tags to a database 66 of tags, receive the results and forward them to end-user computing device 20 as an e-mail. This may allow significant portability and may allow users (which may include any people that make use of system 10, including content provider computing device 14, tagger computing device 18, and researcher computing device 20) to leverage existing capabilities of e-mail software and network operation.

In a further such embodiment a program on end-user's computing device 20 computing device could allow him or her to select a set of tags and then submit it to tool operator computing device 12 (such as to application server 52 as described herein) as a single package or communication. In such an embodiment, researcher's computing device 20 computing device may provide computational power during tag selection, relieving tool operator computing device 12 (and application server 52 and/or webserver 50) of the load required to process the end-user's computing device 20 input one click at a time. This may also provide a good interface for those with unreliable or slow access to network 16, as they would submit their tag sets and receive their results in one transaction rather than having to remain connected to the tool for display updates during tag selection. Of course it is to be understood that both thin and thick system providers and thin and thick computing devices for users are contemplated within the scope of the present invention.

In yet a further such embodiment, a user operating content provider computing device 14, researcher computing device 20, or tagger computing device 18 could host a local copy of a database of tags (that may be stored on data stores 64 is described herein) and a program that would allow use of system 10 and TBRT without connecting, such as via network 16, to tool operator computing device 12 at all. In such an embodiment, the local copy could be updated at a regular interval (through any means, such as over the Internet, via a CD-ROM, or other local manner). In such an embodiment, users may be able to use TBRT without network 16 being a wide area network (WAN), or potentially without network 16 at all. This may reduce bandwidth costs and time of access.

This may be most useful to institutional users such as a school (law school, business school, etc.), library (university library or public library), firm (legal or accounting), or a courthouse.

Such an embodiment may further allow such users to alter the database and tag taxonomy, create branch databases and taxonomies to suit their own purposes, or provide updated tags to tool operator computing device 12, tagger computing device 18 (such as for verification), or content provider computing device 14.

Content provider computing device 14 may provide the content that a researcher may wish to view. Content provider computing device 14 may be the same entity or computing device as tool operator computing device 12, end-user computing device 20, or taxonomist computing device 18. Content provider computing device 14 may actually store the data or may provide mirroring to the actual source of the content.

In one example, content may be legal judgments that are produced by the courts whenever a judicial determination is made. Such judgments may be "reported" (whereby the content may be readily available from one or more sources including other content providers computing device 14) or unreported (in which case the content may be available if it is circulated among members of the profession and is provided to a content provider computing device 14). In such an example content providers computing device 14 may include electronic database services (Quicklaw, eCarswell, BestCase, CanLII) that may include header information (that may represent information about the content, that may be unstructured, textual or otherwise); paper reporters (Ontario Reports, Dominion Law Reports, Supreme Court Reports, etc.); the courts themselves via their official websites or paper record repositories; lawyers or other legal researchers such as end-users (who may possess the text of judgments that have not been reported or otherwise published); libraries, legal and non-legal; and courts of appeal (which may possess the text of the lower-court judgments filed on appeal of those judgments).

Taxonomist computing device 18 may be a operated by a person or agency that applies his, her, or its professional interpretation to content such as a legal judgment, business case or other content. This function can be compared to a summarizer who prepares a précis of a judgment by applying his or her legal training to the task of selecting the relevant passages for inclusion. In the use of TBRT, the researcher is constrained by the tag taxonomy (see below), and must select tags that represent his or her professional interpretation. Tagger computing device 18 may then be used to input the tags into the system via tagger module 56 (as described herein). Tagger computing device 18 may also be used to enter other data about the judgment that is not represented by tags, such as the date of judgment, the judge's name, etc.

Tagger computing device 18 can be operated by any person or agency with an interest of any type in recording his, her, or its interpretation of content such as judgments. Exemplary operators of taxonomists computing device 18 include employees of tool operator computing device 12, any one or more end-users or groups of end-users (such as a group of law students or legal professionals who wish to contribute to the total legal knowledge represented by the system or that desires their own database), a professional who may tag judgments for her own purposes (i.e., marking them for easy retrieval in the future such as a future case). Tool operator computing device 12 may collect some or all interpretations or tags applied by taggers computing device 18. Tool operator computing device 12 may compensate such taggers computing device 18 in many ways, including providing direct monetary compensation, or membership (or enhanced membership) to access system 10.

The terms taggers and taxonomists have been used substantially interchangeably herein, unless the context calls for, or highlights, a particular difference. In general, taggers may use their judgment to apply tags to content, while taxonomists may devise taxonomies. In some circumstances these may be the same person or entity, while in other circumstances the person or entity operating tagger computing device 18 or taxonomist computing device 18 may do one function or the other.

Researcher computing device 20 and tagger computing device 18, as described herein, may be located remotely from one or more of tool operator computing device 12 and content provider computing device 14. They may be any number of hardware configurations allowing access to tool operator computing device 12 and/or content provider computing device 14. This could include researcher computing device 20 and/or tagger computing device 18 being operated by substantially the same entity and/or computing device as tool operator computing device 12 or content provider computing device 14. In one exemplary embodiment, as shown in FIG. 1, researcher computing device 20 may be a person using a personal computer (PC) which is configured to access tool operator computing device 12 over communication network 16. Other embodiments may be described herein.

Communication network 16 (network 16) may be any network configured to allow one or more of tool operator computing device 12, content provider computing device 14, researcher computing device 20 and tagger computing device 18 to access and/or communicate between one another. Exemplary communication over network 16 may include: researcher computing device 20 providing inputs to tool operator computing device 12 (such as view user screens as shown and described herein) to result in a search being performed and search results being provided; researcher computing device 20 being used to select content to view, such content being provided by content provider computing device 14, optionally via tool operator computing device 12; and tagger computing device 18 providing tag information to tool operator computing device 12 or content provider computing device 14, such taxonomy optionally being added to one or more databases of tags.

Network 16 may any local area network ("LAN") or WAN and may be at least partially wired or wireless (including, for example, wireless Internet, RFID, Infra-red, or Bluetooth). Although shown, in FIG. 1, as one network cloud, network 16 may comprise one or more networks having one or more characteristics and/or protocols. In one embodiment, network 16 may be the Internet. In a further embodiment, network 16 may be the Internet while other portions of network 16 are LANs located at one or more of researcher computing device 20, tagger computing device 18 and content provider computing device 14. In yet a further embodiment, network 16 may be a Virtual Private Network (VPN) implemented across geographically remote sites.

In still a further embodiment, communication network 16 may not be required as substantially all of the aspects of the present invention may be practiced locally on a single computing device, such as a computing device of a researcher or taxonomist. Although practiced locally, one or more communication networks 16 may be occasionally employed to access updates—such as new taxonomies, new tags, new research materials, and the like.

Figure 2:
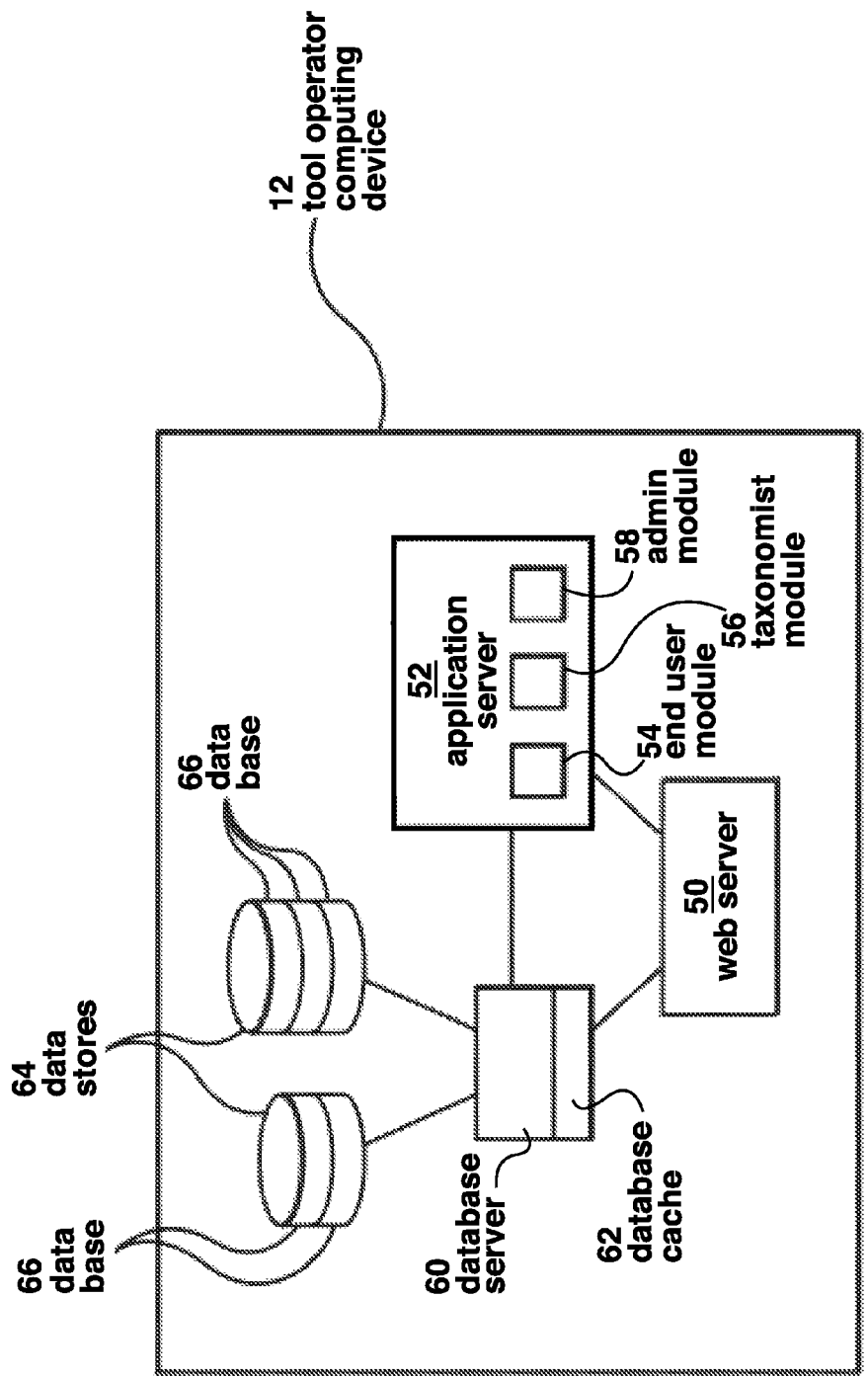
FIG. 2 is a further diagram of an example system.

FIG. 2 is a further diagram of an embodiment of tool operator computing device 12 according to the invention comprising web server 50, application server 52 further comprising end-user module 54, taxonomist module 56 and administrative module 58, database server 60 further comprising database cache 62, and one or more data stores 64 comprising one or more databases 66.

Web server 50 may create a link between the application server and the computing device 20. Web server 50 may accept output from application server 52 and delivers it to end-user computing device 20. It may also contain business logic in the way in which it renders the web-page.

Application server 52 may store and execute the software and execute end-user computing device 20, content provider computing device 14, and tagger computing device 18 interactions with one or more data stores 64 and databases 66. Application server 52 may process changes to the database (such as creating tag taxonomies, specifying tags for content, etc.) as implemented by tagger computing device 18 and researcher computing device 20 and may submit query requests as entered by the end-user computing device 20. Such changes may arise from user inputs provided to system 10, for example by users' use of computing devices and one or more screens (such as those shown in FIGS. 3-4). Application server 52 may have one or more modules such as researcher module 54, tagger module 56, and administrative (admin) module 58. Such modules may assist in performing some or all of the functionality of application server 52. Although various modules are described herein, it is to be understood that various arrangements of modules, and division of responsibilities between modules, are possible within the scope of various embodiments of the present invention.

Tagger module 56 may allow tagger computing device 18 (or other users that may specify tags for content) to store his or her professional interpretation of judgments, as rendered in tags. It may do the following:

1. Submit requests to database server 60 for information on its contents and state.
2. Create one or more webpages that may, for example, display some of this information as well as options for altering the contents of the database.
3. Deliver one or more webpages to tagger computing device 18 or researcher computing device 20 via the web server 50.
4. Receive one or more inputs, such as input signals, via the webpage and translate that input into database commands (to add, remove, move, or alter data in one or more databases 66).
5. Submit the database commands to database server 60 for execution.

End-user module 54 may do the following:

1. Handle end-user computing device 20, content provider computing device 14, or tagger computing device 18 profiles, settings, and login/logout requests.
2. Submit requests to database server 60 for information on its contents and state.
3. Create one or more webpages that may, for example, display some of this information as well as options for selecting tags.
4. Deliver one or more webpages to web server 50 for delivery to end-user computing device 20.
5. Accept input via the webpage or other sources and translate them into database commands, then submit these commands to server 50 for execution.
6. Accept output from database server 60 resulting from the execution of database commands and translate it into a format useful to end-user computing device 20 and deliver the translated output to end-user computing device 20 via web server 50.
7. Accept indications via end-user computing device 20 that searching is terminated and a subsequent request to view the results, collate the results, generate one or more webpages that displays them, and delivers it to the end-user computing device 20 via web server 50.
8. Accept and execute indications from end-user computing device 20 that he or she wants to view or use another part of the TBRT (e.g., the end-user clicks the Help or Account Management links on a main webpage).

Administrative module 58 may allow tool operator computing device 12 to access and utilize built-in administrative functions such as adding or removing user access (such as end-user access), alter the operation of the tool, logging and benchmarking, etc.

Database server 60 stores or is connected to one or more data stores 64 (which may house one or more databases 66) and database cache 62, and executes database queries requested by application server 52. Database server 60 also records and maintains end-user profiles, end-user settings, operator configuration settings (set via the administrative module of the application), etc. One or more databases 66 can also contain business logic via stored procedures and query optimizations.

Database cache 62 may exist on database server 60. Database cache 62 may store the results of recent end-user computing device 20 selections such that the results are less computationally expensive to retrieve if the same search is submitted. (For example, if three specific tags were recently selected by the same end-user, the result stack for that combination of tags would be fetched from database cache 62 if those same tags were later selected by a different end-user.) The TBRT may also automatically calculate the results of several or all permutations of tag selection and store them in the cache to decrease the computational cost of their retrieval and thereby improve the end-user experience.

Data stores 64 may store data relating to system 10 and any tasks or functionality provided by tool operator computing device 12. Data stores may exchange data with other parts of tool operator computing device 12 and hence system 10. Data in data stores 24 may be in any format and organized in any way known to those of skill in the art and may include one or more databases 66.

One or more databases 66 may reside on, or be operably connected to, database server 60. They may contain the information about a judgment that has been entered by, for example tagger computing device 18 or researcher computing device 20. Databases 66 may contain only data that describe the judgment (date, judge's name, etc.) and the researcher's professional interpretation of the judgment as rendered in tags (not the text of the judgment). The schema of the database can be optimized, and can by its very design embody business logic.

Example Database Schema

An exemplary database table storing data related to a judgment might look as follows:

| Identifier | Judgment Name | Judge's Name | Date | Citation | Court Level | Jurisdiction |
|---|---|---|---|---|---|---|
| #### | | | | | | |

The database contains a table that stores the tag taxonomy relevant to the area of law for which the tool has been adapted. Tags have attributes such as "bold," "parent" (i.e., whether they stand alone or are the children of another tag), and how they should be displayed to the end-user (e.g., bold, italicized, hidden, etc.). One version of a database table storing a tag taxonomy judgment might look as follows:

| Identifier | Tag Name | Parent | Numerical Data (Y/N) | Bold (Y/N) |
|---|---|---|---|---|
| #### | | | | |

The database also contains a table that associates the identifier of a particular tag with a list of identifiers of judgments to which the researcher has applied that tag. This table is only two columns wide, and might look as follows:

| Tag Identifier | Associated Judgment Identifier |
|---|---|
| #### | |

In one exemplary use of one embodiment of the present invention, the TBRT may work as follows:

1. Tool operator computing device 12 is used to create an empty database for content, such as an area of law. The area of law selected is of arbitrary size and scope (e.g., criminal sentencing, spousal support family law orders, judgments decided in a particular U.S. state, judgments containing any international aspect, etc.).

2. Tool operator computing device 12, taxonomist computing device 18, are used to devise a taxonomy of tags, as described herein, relevant to the area of law being indexed and inputs the taxonomy into the tool.

3. Tool operator computing device 12 is used to generate a database, as described herein, that can store information about a judgment (such as the judges who authored them, issue dates, etc.) as well as the tags of the taxonomy that are associated with them (at this point, none).

4. Tagger computing device 18 logs into the TBRT, such as via methods known in the art. Tagger computing device 18 may log into a portion of the TBRT, such as tagger module 56 that may only be accessible to taggers computing device 18 and not researchers computing device 20. This may be, for example, to separate what different functionality a user can access.

5. Tagger computing device 18 reads a judgment or other document pertinent to that area of law (that may be drawn from an external source) and renders his or her professional interpretation of the judgment. This may include facts, analysis, and other relevant features as a set of tags selected from the taxonomy. The pattern of selection and non-selection of tags represents the researcher's professional interpretation of the judgment.

6. The TBRT tool displays a screen (not shown) to tagger computing device 18 that permits input of the selected tags. The tool also permits the inputting of textual information about the judgment (e.g., judge's name, issue date, etc.).

7. The TBRT commits the data inputted by researcher into one or more records in the database established in step 1.

8. End-user computing device 20 is used to log into the TBRT. End-user computing device 20 may be used to log into a portion of the TBRT, such as end-user module 54 that may only be accessible to researchers computing device 20.

9. The TBRT displays the taxonomy with a checkbox or other method of selection next to each tag that can be selected. One exemplary view of the taxonomy may be substantially similar to that shown in FIG. 3 and described herein.

10. Each time end-user computing device 20 receives input selecting or deselecting a tag from this display via an interaction (for example from a pointing device, keyboard, audio signal, etc.), the TBRT receives this information and queries the database. The database counts and identifies the judgments that are associated with that tag.

11. The TBRT generates any results comprising the identifiers of judgments associated with that tag and any of the other tags currently selected by end-user computing device 20.

12. The TBRT displays the number of results in the stack and relevant data about the records referenced in the stack to end-user computing device 20 substantially in real-time.

13. When an indication is received at end-user computing device 20 indicating that final selection of a combination of tags, the tool displays the records referenced in the stack as well as data about those results (e.g., where to retrieve the content, etc.).

Exemplary Screens

Figure 5:
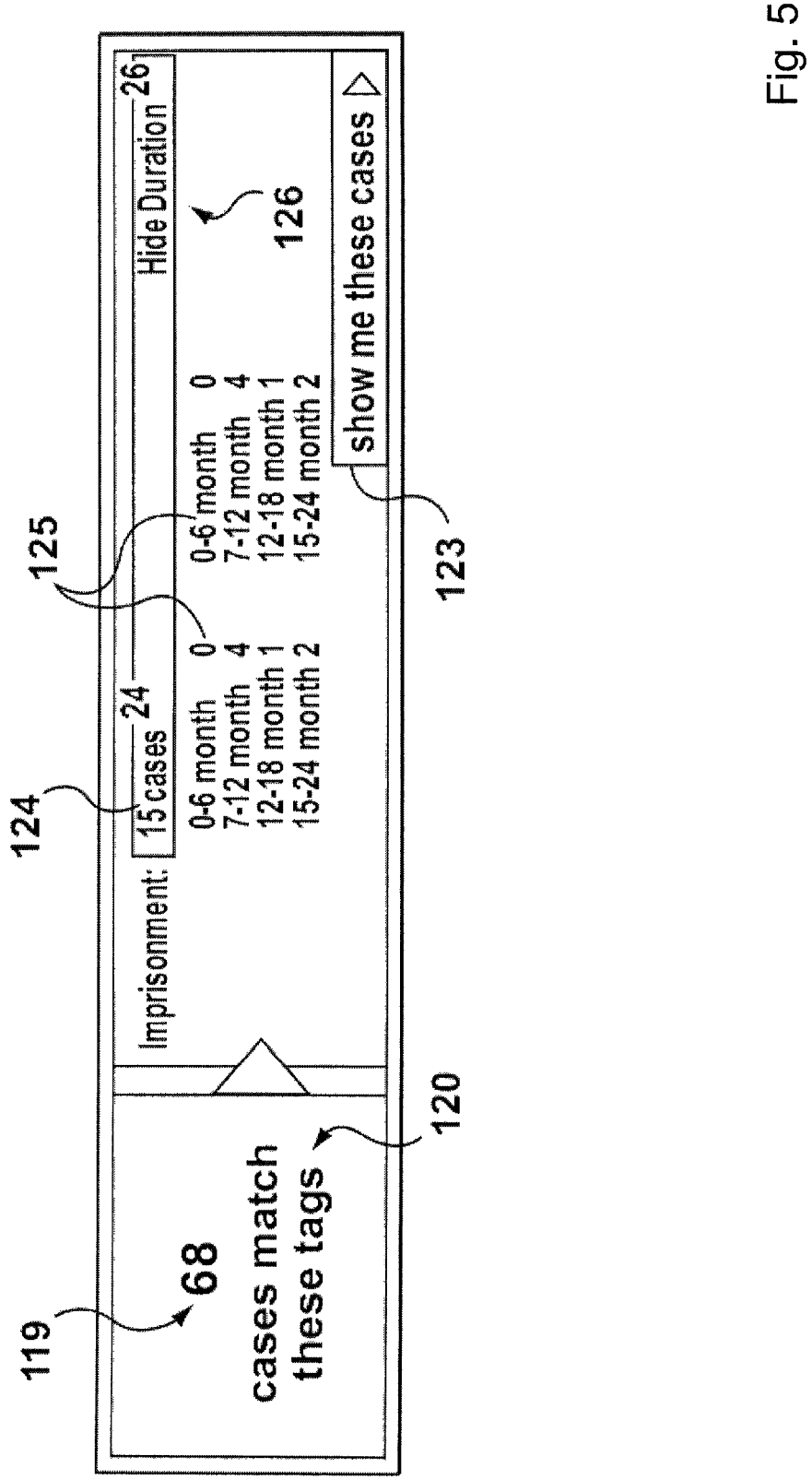
FIG. 5 is an embodiment of screens for tag-based research.

FIG. 3, FIG. 4, and FIG. 5 are non-limiting examples of screens for tag-based research according to the invention. It is to be understood with any such screens in FIG. 3, FIG. 4 and FIG. 5 may be viewed on virtually any computing device of system 10 or tool operator computing device 12. Such screens, and the various elements thereon may be created by one or more parts of tool operator computing device 12 as described herein and known in the art. Although various interaction elements, links, text fields, and other web page elements are shown, it is to be understood that other elements can be used, and the layout changed. Further, web pages or screens may not even be required to implement aspects of the present invention, as described herein. Various technologies may be employed to effect input and output interaction via screens and system 10. Many of such technologies are known in the art and are not provided herein. Screens may be used for interaction with web server 50, or other parts of tool operator computing device 12, and may show data from data stores 64 (such as tags, taxonomies etc), cause alteration of data in data stores 64. Screens may further be used to show content from content provider computing device 14, such as via linking to the content or displaying content in system 10 to obtain from content provider computing device 14.

Elements of the screens in FIGS. 3-4 will be briefly described below, with some reference to aspects of embodiments of the present invention described herein.

FIG. 3 provides an exemplary screen for tag based research. FIG. 4 provides an exemplary screen after receipt of input via a computing device (such as end-user computing device 20) representing the instruction: "show me these cases" 123. FIG. 5 shows a user screen or pane that may be displayed to show further particular aspects of results. For example, and as shown, such a screen may show a breakdown of durations of sentences in rangefinder. Such a screen may be its own screen or may be shown as a pane as part of another screen, such as a pane with FIG. 4 when "show duration" computing device 122 is selected. Such screens comprise the following elements:

Element Description

| Element | Description |
|---|---|
| 101 | "rangefinder" This is for branding purposes. Different uses/users/content of the TBRT may have different branding. |
| 102 | "home" Brings the end-user to the sign-in page. |
| 103 | "about" Displays information about the TBRT and its operator (tool operator 12). |
| 104 | "contact" Displays a contact form. |
| 105 | "settings" Allows the user (researcher 20, tagger 18, tool operator 12 etc) to adjust user-specific settings. |
| 106 | "news" Displays a news page, for example, anything that shows news posts such as a blog-style content management system (CMS) with recent developments and statistics on the TBRT. |
| 107 | "help" Displays a page with instructions on using the tool. |
| 108 | "log off" Ends the user's session. |
| 109 | "Accused" A category of tags. The currently-selected tag is "Accused." End-user 20 can click on a category to view the tags it contains in the middle pane. |
| 110 | "has selections" Indicates whether a category has any selected (checked) tags within it. Categories containing selected tags in the example are Accused, Complainant, Procedure, Conditions, and Judgment. |

-continued

| Element | Description |
|---|---|
| 111 | "Aboriginal" An unselected tag. In this case, describes whether the Complainant is Aboriginal. |
| 112 | checkbox The method by which the end-user selects and deselects the tag. In this case, the tag Aboriginal is not selected. |
| 113 | "Gladue report" A child tag of the parent tag Aboriginal. The indent visually indicates to the end-user that the child is related to the parent, but otherwise the tag functions no differently. |
| 114 | "Addiction: Alcohol" A selected tag. In this case, the tag "Addiction: Alcohol" is selected. |
| 115 | "clear all" Deselects all tags when clicked. |
| 116 | "previous" Displays the tags in the previous category when clicked, in this case Pre-Sentence Behaviour. |
| 117 | "next" Displays the tags in the next category when clicked, in this case Offence. |
| 118 | scroll bar Allows the end-user to scroll the middle pane up and down to view more tags in the current category. |
| 119 | "68" The number of judgments in the stack. This number updates with every selection or deselection of a tag. |
| 120 | "cases match these tags" This text does not change. |
| 121 | "0" Displays the number of judgments (content) in the stack or results with a particular punishment. Updates with every tag selection or deselection. In this case, the number of judgments in the stack in which discharges were given is displayed. |
| 122 | "show durations" When clicked, the bottom pane alters to show imprisonment durations of the judgments in the stack (see below and FIG. 5). Panes or other users screens may be used to display aspects of content for a user. Such may be aspects or tags of particular interest to that researcher. One example may be durations of prison sentences. |
| 123 | "show me these cases" When clicked, displays the tool's results or records of the content (judgments) in the result list or stack to the end-user. Such may show content, content identifiers, or links thereto. |
| 124 | "15 cases" The number of judgments in the stack that had imprisonment applied as a punishment. Such may be the number of content matching the searched for tags (i.e., having the relevant tags) as determined by, for example, a researcher. |
| 125 | durations. This area shows how many judgments in the stack resulted in a particular duration of imprisonment. (these numbers could equal the number displayed at number 24, above). Such may be one example of further processing that tool operator may do as a search is performed and this may allow calculation of, and display of, averages or other further information. |
| 126 | "hide durations" Clicking this may return the end-user to the regular tag selection screen (see above and FIG. 4). |
| 127 | "sort by" Determines how to sort and display the results. |
| 128 | "Print|Save" For printing and saving results or content etc. |
| 129 | "R. v. Gretzky" Style of cause of one result or an identifier of content. Each result or content may appear in a box with the style of cause at the upper-left. A second result appears below. |
| 130 | "show tages . . ." Displays the tags applied to this result. |
| 131 | date, etc. Displays non-tag metadata about the judgment. |
| 132 | "Offence(s)" The offences dealt with by the court in this judgment. |
| 133 | "Sentencing" The sentence applied for each offence. |
| 134 | "Total Sentence" The final sentence imposed in the judgment. This may be a characteristic of the content and may have been part of one of the tags selected by a user. Other such characteristics or tags may also be used, in conjunction or alone. |
| 135 | "Citations" Citation references for the judgment. This may be an example of a content identifier. |
| 136 | "download this case" Links to content providers that carry the content (such as the judgment). The content providers that appear here may be set in the database. Advertising paid by a content provider may alter the appearance of such download options. May also be "download this content." |
| 137 | Page navigation. Allows end-user to view multiple pages of results. |
| 138 | "alter this search" Returns the end-user to the tag selection page, optionally with his or her tags still selected. |
| 139 | "start new search" Returns the end-user to the tag selection page with no tags selected. |
| 140 | "R. v. Howe" The style of cause of a second result, or content. |

It will be apparent to one of skill in the art that other configurations of modules and hardware may be used in any of the foregoing embodiments of the products, methods, and systems of this invention.

Figure 6:
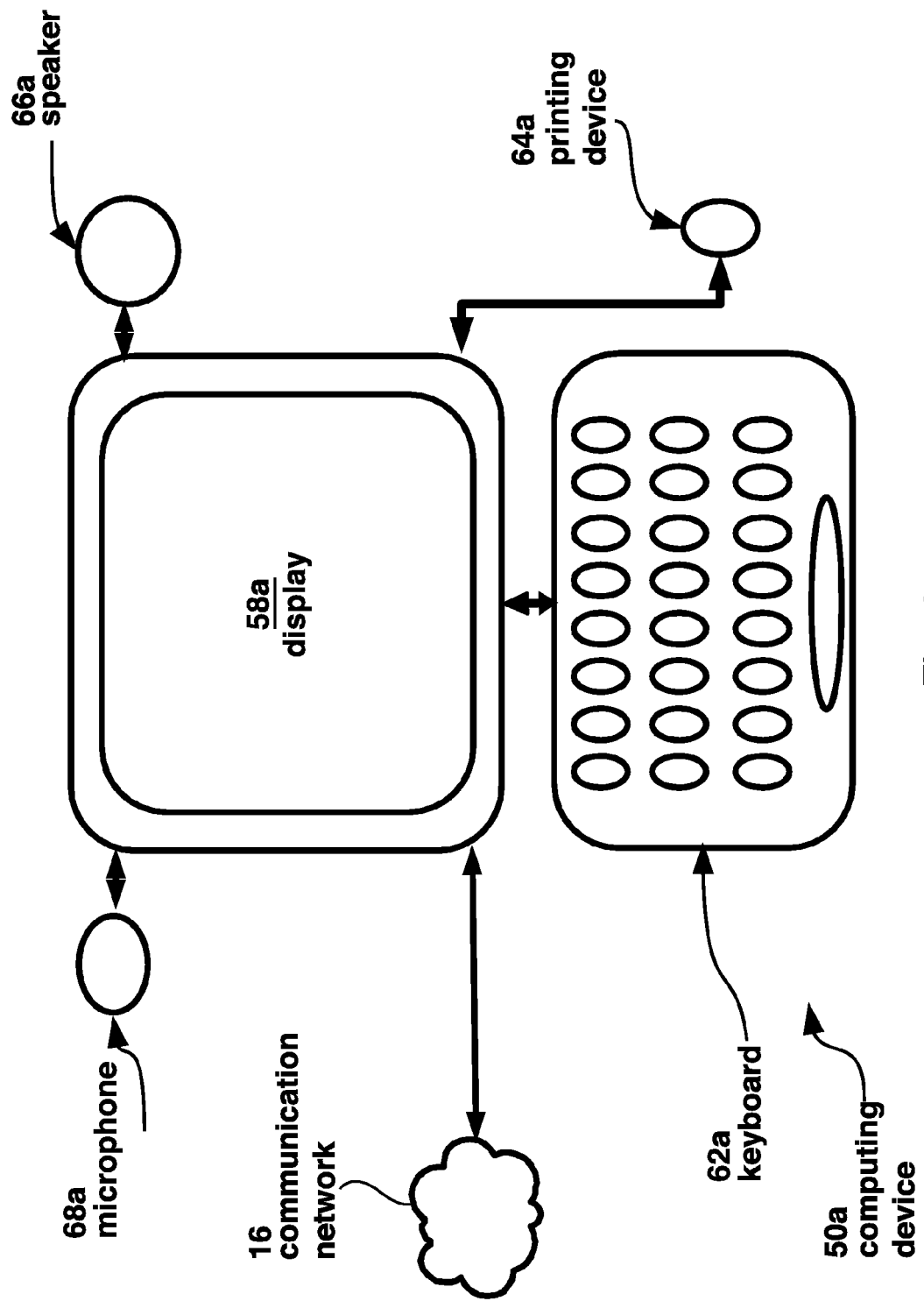
FIG. 6 is a diagram of a computing device.

FIG. 6 shows a structure for a computing device 50a suitable for implementation of various teachings of this specification. For example, computing device 50a (or variations thereon) can be used to implement computer equipment respective to content provider computing device 14, tagger computing device 18, or researcher computing device 20, each of which connect to network 16. As another example, computing device 50a can be configured to generate the sample screens discussed in relation to FIG. 3, FIG. 4 and FIG. 5. As another example, computing device 50a or variants thereon can also be used to implement the computer equipment discussed in relation to tool operator computing device 12, including, for example, web server 50, application server 52 or database server 60.

In the present, non-limiting example, computing device 50a comprises a display 58a that can comprise one or more light emitters such as an array of light emitting diodes (LED), liquid crystals, plasma cells, or organic light emitting diodes (OLED). Computing device 50a also comprises a keyboard 62a. Device 50a may also comprise a pointing device 64a which can be implemented as a mouse, touch-pad, joystick, trackball, track-wheel, or as a touch sensitive membrane on display 58a. Device 50a also comprises a speaker 66a for generating audio output, and a microphone 68a for receiving audio input.

Figure 7:
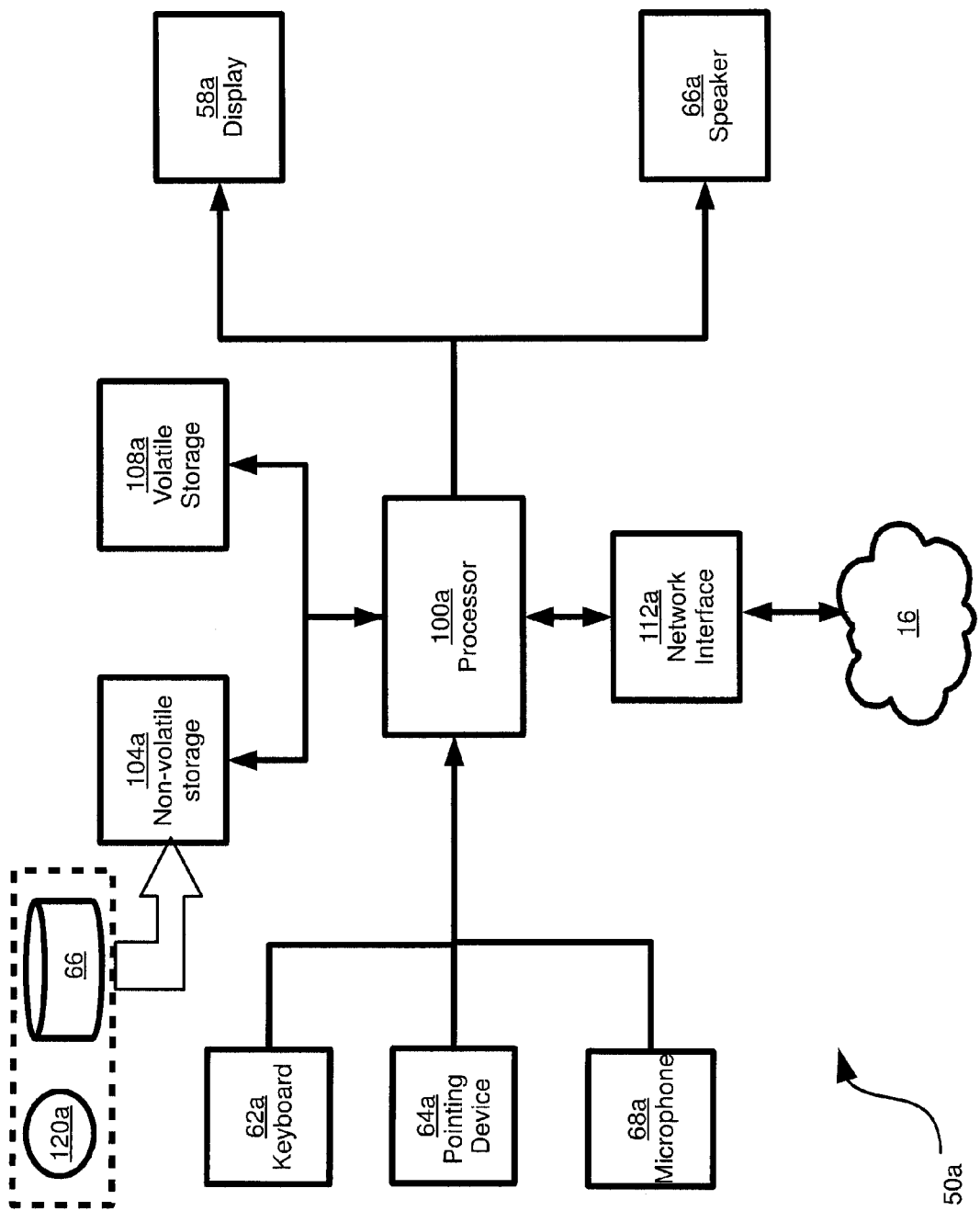
FIG. 7 is a block diagram of various components of the computing device of FIG. 6.

FIG. 7 shows a schematic block diagram of certain electronic components of device 50a. It should be emphasized that the structure in FIG. 7 is an example. Device 50a includes a plurality of input devices which in a present embodiment include keyboard 62a, pointing device 64a and microphone 68a. Other input devices are contemplated, such as a camera. Input from keyboard 62a, pointing device 64a and microphone 68a is received at a processor 100a (which can be implemented as a plurality of processors). Processor 100a can be configured to execute different programming instructions that can be responsive to the input received via input devices. To fulfill its programming functions, processor 100a is also configured to communicate with a non-volatile storage unit 104a (e.g. a hard disc drive, Erase Electronic Programmable Read Only Memory ("EEPROM"), Flash Memory) and a volatile storage unit 108a (e.g. random access memory ("RAM")). When device 50a is used to implement database server 60, then database cache 62 can be implemented in volatile storage unit 104a, and data stores 64 can be implemented in non-volatile storage unit 104a. Programming instructions that implement the functional teachings of device 50a as described herein are typically maintained, persistently, in non-volatile storage unit 104a and used by processor 100a which makes appropriate utilization of volatile storage 108a during the execution of such programming instructions.

Processor 100a in turn is also configured to control display 58a and speaker 66a also in accordance with different programming instructions and optionally responsive to different input received from the input devices.

Processor 100a also connects to a network interface 112a, which can be implemented for communication over a wired or wireless link or both of them to network 16. Network 16 itself can be an Intranet, or any type of local area network, the Internet, or any type of wide area network, or combinations of any of the foregoing. Network interface 112a can thus be generalized as a further input/output device that can be utilized by processor 100a to fulfill various programming instructions. It will be understood that interface 112a is configured to correspond with the network architecture that defines its link to network 16.

As will become apparent further below, device 50a can be implemented with different configurations than that described, omitting certain input devices or including extra input devices, and likewise omitting certain output devices or including extra input devices. Furthermore, the individual components may be sourced from different manufacturers and may be architected differently. Furthermore, different operating systems executed on processor 100a. Other variant configurations will now occur to those skilled in the art.

In a present embodiment, device 50a is also configured to maintain, within non-volatile storage 104a, a research application 120a and one or more research databases 66. Any one or more of reference research application 120a and a research database 66 can be pre-stored in non-volatile storage 104 or downloaded via network interface 112a and saved on non-volatile storage 104a. Alternatively, and not shown in FIG. 7, research application 120a or research database 66 or both of them can be hosted on another computing device (not shown) which acts as a server, and can be accessed via network 16 and used by processor 100a as needed during remote access.

Research application 120a can be implemented such that when executed by processor 100a, processor 100a is configured to control display 58a so as to generate the images shown in FIG. 3, FIG. 4 and FIG. 5, and to also function according to other aspects as discussed above in relation to FIG. 3, FIG. 4 and FIG. 5.

Figure 8:
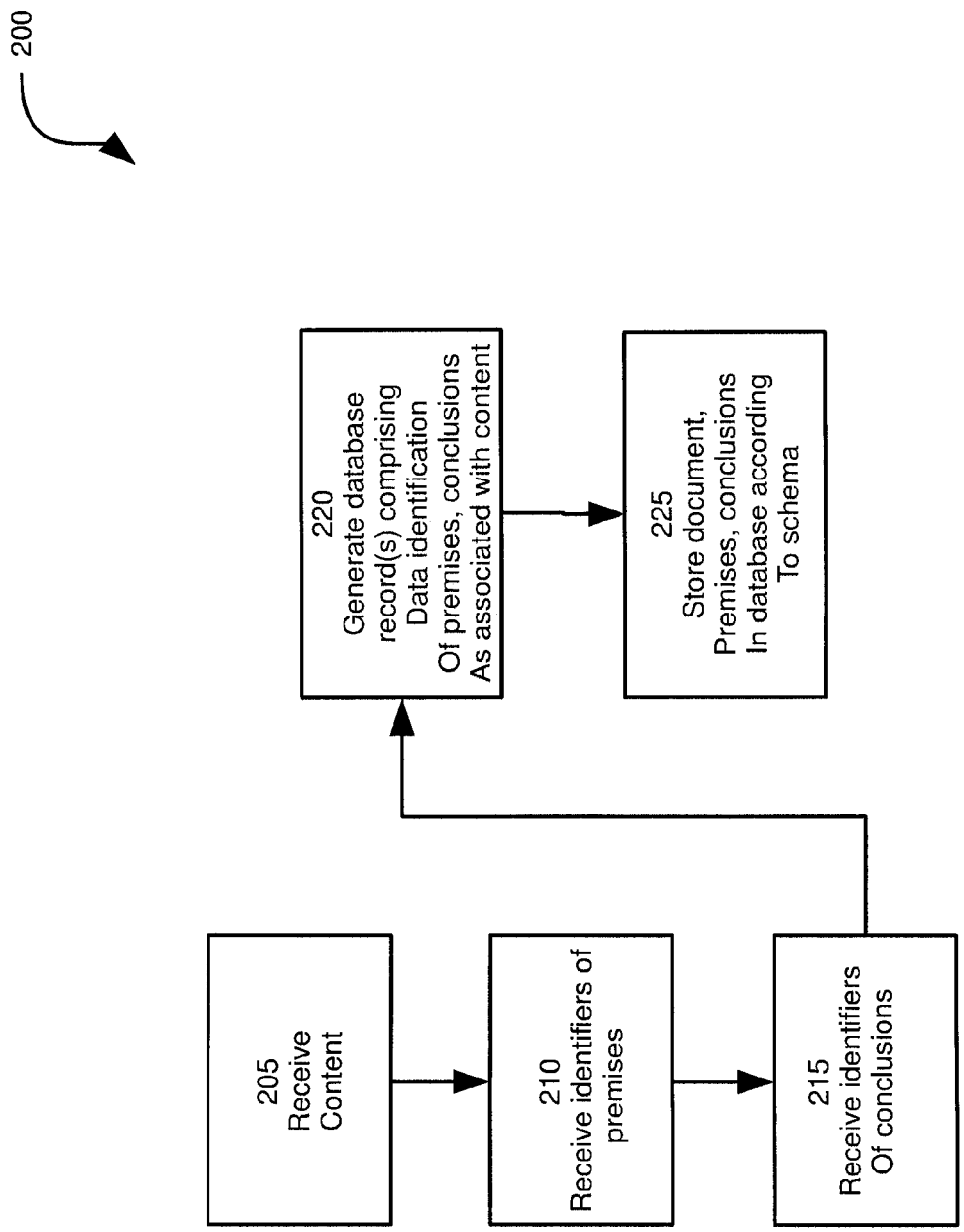
FIG. 8 is a flow-chart showing a method of research database management.

Referring now to FIG. 8, a flow-chart representing a method for database management is indicated generally at 200. Method 200 can be implemented as programming instructions that are executed on a suitable variation of device 50. Method 200 can be used to generate research database 66 (or research databases 66), which in turn can then be used by research application 120a.

Figure 9:
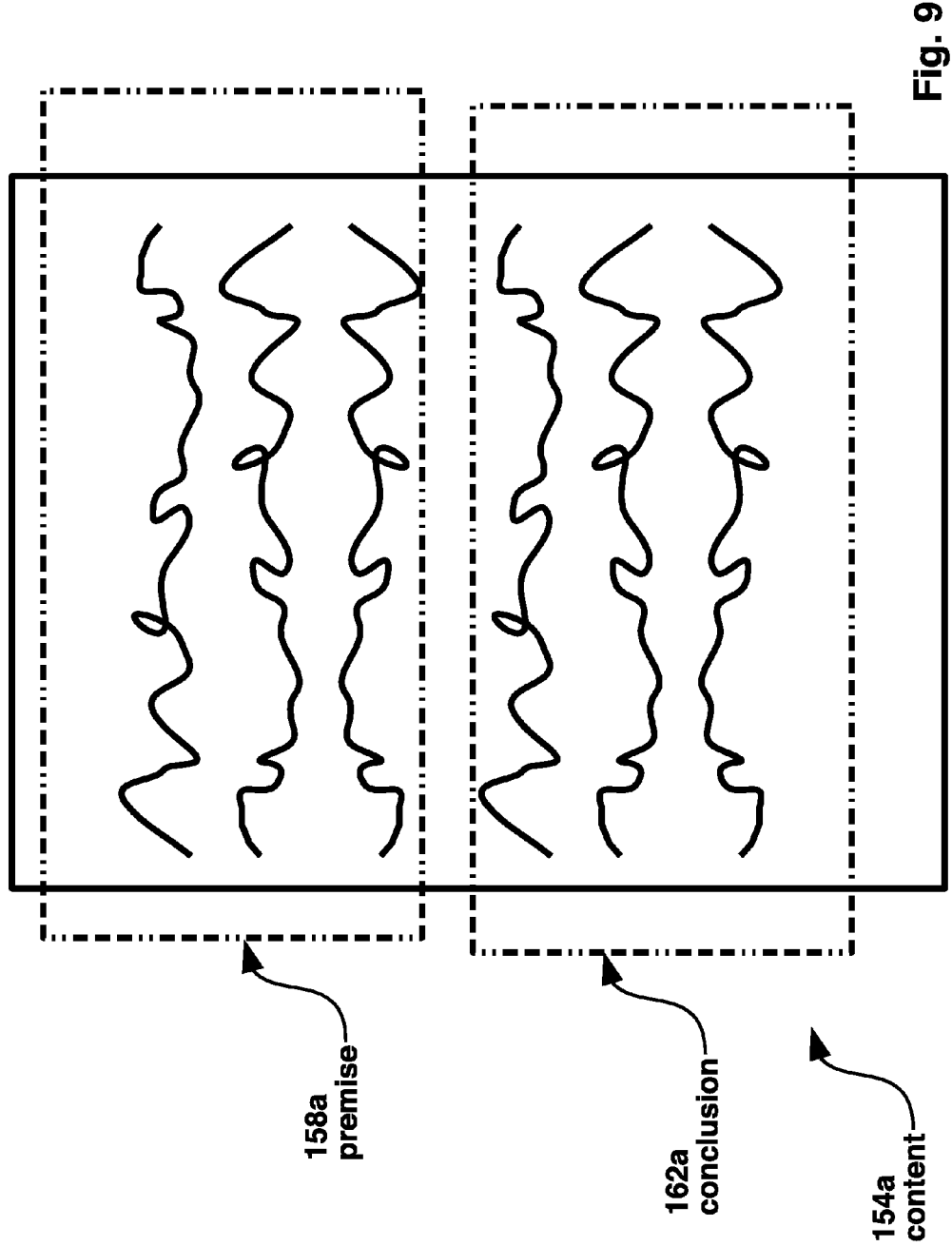
FIG. 9 is a graphic representation of content that is subject to research or analysis that can be utilized in the method of FIG. 8.

Block 205 comprises receiving content. The type of content that is received at block 205 is not particularly limited. However, in a present embodiment, the content received at block 205 comprises text, and may additionally comprise figures, and where such text comprises at least one premise 158a and at least one conclusion 162a that is derived from or associated with the at least one premise 158a. FIG. 9 provides a representation of content 154a that can be received at block 205. Content 154a comprises at least one premise 158a and at least one conclusion 162a that is derived from the at least one premise 158a. Note that in FIG. 9, the premise 158a and conclusion 162a is shown as respective, clearly delineated halves of content 154a, but those skilled in the art will recognize that the actual locations, apportionment, etc., of premise 158a and conclusion 162a are often not elegantly divided, and in fact aspects of each may be dispersed with each other.

Examples of content 154a that comprise at least one premise 158a and at least one conclusion 162a include, without limitation, legal decisions, business case studies, pharmacological studies, or psychological or social science studies.

In the context of legal decisions, the at least one premise 158a comprises the facts of a case. In a criminal law case, the facts can include a character profile of the accused, a character profile of the victim, the act performed against the victim, and an identification of an offense that is satisfied by the accused's acts performed against the victim. The at least one conclusion 162a derived from the at least one premise 158a can comprise a finding of guilt or innocence. In the case of a finding of guilt, then the at least one conclusion 162a can further comprise a sentence that is imposed on the accused. In a civil law case, the facts can include a character profile of the plaintiff, a character profile of the defendant, the act performed against the defendant, and an identification of a tort or statutory violation that is satisfied by the defendants act's performed against the plaintiff. The at least one conclusion 162a derived from the at least one premise 158a can comprise a finding for or against the plaintiff. In the case of a finding for the plaintiff, then the at least one conclusion 162a can further comprise a financial damage award or the issuance of a restraining order. In the case of a finding for the defendant, then the at least one conclusion 162a can comprise a cost award, if any, imposed on the plaintiff.

In the context of business case studies, the at least one premise 158a can comprise the facts of the particular business entity being studied, including the type of business organization (e.g. sole proprietorship, public corporation, private corporation, multinational), the nature of the business being performed by the organization (e.g. manufacturing or services), the economic climate in which the business operated, the market size, marketing efforts, the personal profiles of the management and executive team. The at least one conclusion 162a derived from the at least one premise 158a can comprise a summary of the financial performance (e.g. profit vs. loss on a year over year basis) of the business over a time period corresponding to a period of time associated with the at least one premise 158a.

In the context of pharmacological studies, the at least one premise 158a can comprise a profile of life forms upon which the study was performed, including an identification, if any, of a control group, the chemical and physical nature of the pharmacological agent, the method of administration of the pharmacological agent, and the time period over which the pharmacological agent was administered. The at least one conclusion 162a can comprise the resulting change on the life forms, if any, and whether the study is deemed to have any predictive value for subsequent administration of the pharmacological agent.

In the context of psychological or social science studies, the at least one premise 158a can comprise a profile of life forms upon which the study was performed, including an identification, if any, of a control group, the nature of the social agent that was applied to any portion of the group, the method of administration of the pharmacological agent, over which the agent was administered. Such social agents can comprise, for example, social work techniques, counseling techniques, educational techniques. The at least one conclusion 162a can comprise the resulting change on the life forms, if any, and whether the study is deemed to have any predictive value for subsequent administration of the social agent.

Figure 10:
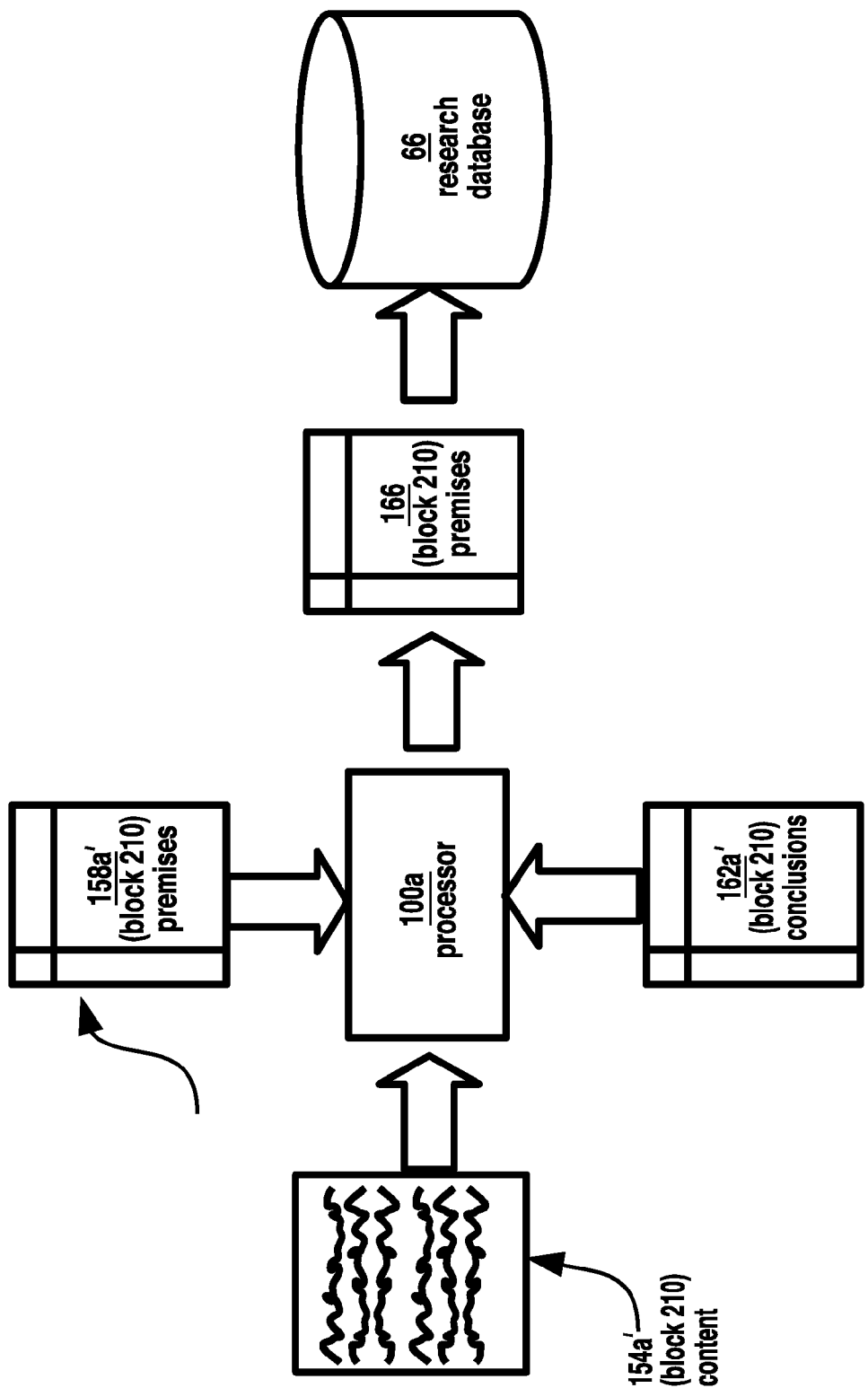
FIG. 10 is shows various components from the device of FIG. 7 as performing various blocks from the method of FIG. 8.

Exemplary performance of block 205 is represented in FIG. 10, as a data representation of content 154a is indicated at the reference 154a'. Data representation of content 154'a is shown as being received at processor 100. Data representation of content 154a' can be an electronic data file comprising text in the form of American Standard Code for Information Interchange (ASCII) or HTML or other suitable format that provides an electronic data representation of content 154a. Data representation of content 154a' can be generated by OCR of paper-based content, or can be generated directly upon original generation of content 154. Thus, input devices or network interfaces connected to processor 100a can be used to provide the input of data representation of content 154'a to processor 100a.

Block 210 comprises receiving data representations of premises within the content received at block 205. Thus, such data representations of premises can be provided in the form of tags. Indeed, the previous detailed discussion of Tags, Tag Taxonomy, (and the following discussions and example use of Tags), provides non-limiting examples of how such tagging can be effected. Where data representation of content 154a' is an HTML document, then HTML tags can be associated with the data representation of content 154a' in conjunction with any portion or portions of content 154 that comprises premises 158a.

Exemplary performance of block 210 is represented in FIG. 10, as a data representation of premises 158a are indicated at the reference 158a'. Data representation of premises 158a' can, for example, be HTML tags associated with an HTML version of electronic data representation of content 154a. Data representation of premises 158a' can be generated by providing input via input devices connected to processor 100a that associate such tags with the data representation of content 154a'. Again, such tags can be generated upon original creation of content 154a, or during subsequent generation of content 154a' from content 154a.

Block 215 comprises receiving data representations of conclusions within the content received at block 205 associated with or derived from the premises received at block 210. Thus, such data representations of premises can be provided in the form of metadata. Indeed, the previous discussion of metadata (e.g. metadata in the form of sentences from legal decisions) that can be associated with the previous detailed discussion of Tags, Tag Taxonomy, (and the following discussions and example use of Tags) provide non-limiting examples of how such association of metadata can be effected. Thus, where data representation of content 154a' is an HTML document, then HTML metadata can be associated with the data representation of content 154a' as well as with data representation of premises 158a' in conjunction with any portion or portions of content 154 that comprise conclusions 162a.

Exemplary performance of block 215 is represented in FIG. 10, as a data representation of conclusions 162a are indicated at the reference 162a'. Data representation of premises 162a' can, for example, be metadata associated with an HTML version of electronic data representation of content 154a. Data representation of conclusions 162a' can be generated by providing input via input devices connected to processor 100a that associate such metadata with the data representation of content 154a' and the data representation of conclusions 158a'. Again, such metadata can be generated upon original creation of content 154a, or during subsequent generation of content 154a' from content 154a.

Block 220 comprises generating database records comprising the data representation of premises from block 210 and the data representation of conclusions from block 220 as associated with the content received at block 205. Performance of block 220 is represented in FIG. 8 as database records 166 are shown being generated by processor 100. Database records 166 are then stored in research database 66 at block 225.

Method 200 can thus be performed a plurality of times to populate database 66 with a plurality of content. Thereafter, when application 120a is executed, the selection of tags (which correspond to premises from block 210) as shown, for example, in FIG. 3 results in dynamic and real-time identification of intersections of content that satisfies such tag selection, thereby resulting in the generation of the screen, for example, shown in FIG. 5. Specific results of interest can then be examined using the screen, for example, shown in FIG. 4.

Figure 11:
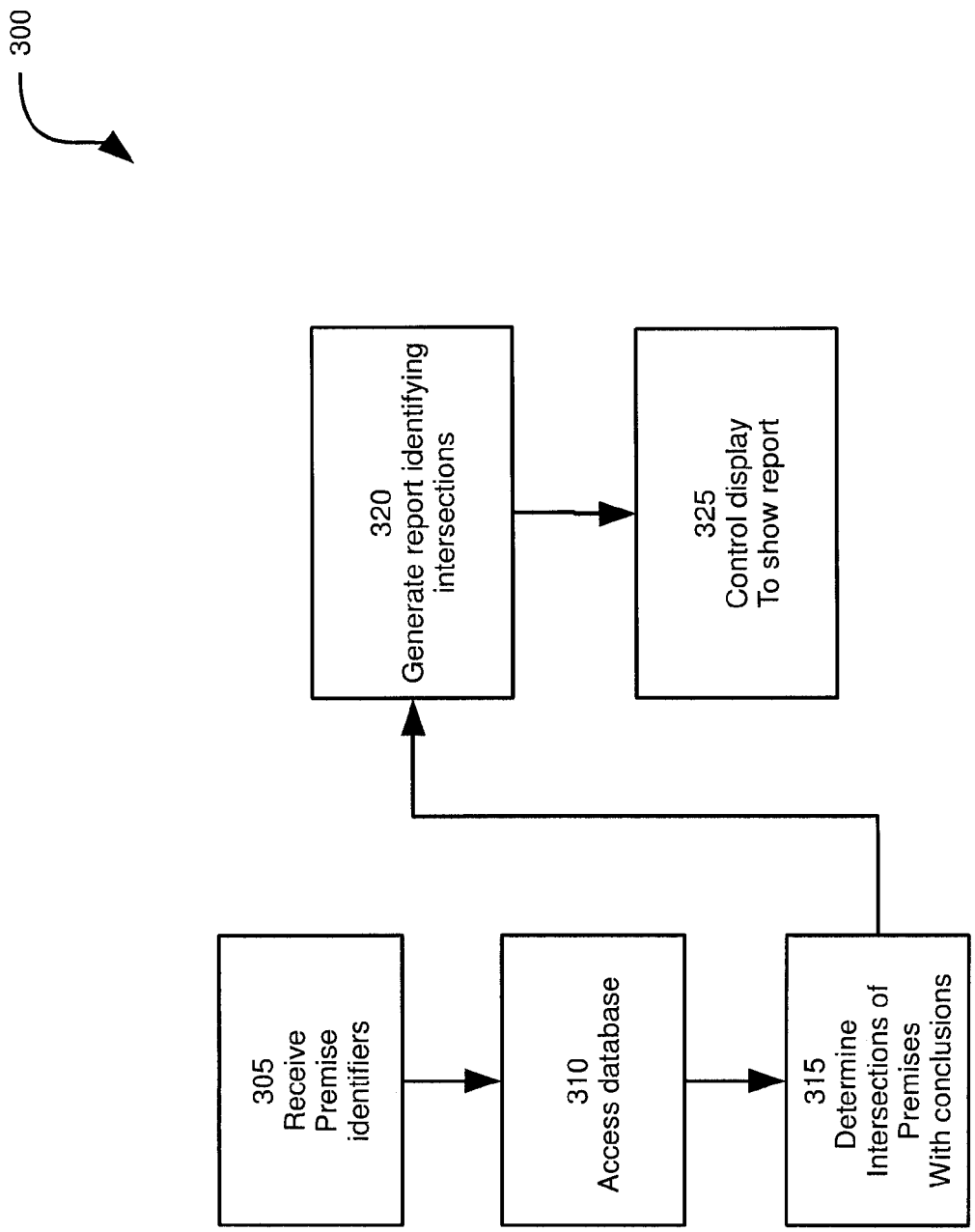
FIG. 11 is a flow-chart showing a method of electronic database research.

FIG. 11 shows a flow-chart depicting a method that can be used to implement application 120a and which is indicated generally at 300. Block 305 comprises receiving premise identifiers at processor 100. FIG. 3 shows an example of performance of block 305, as various tags are selected. Block 310 comprises, as performed by processor 100, accessing a database that contains content which includes premise identifiers that are received at block 305. Block 315 comprises, as performed by processor 100, determining intersections of conclusions within the content that correspond with the premise identifiers from block 305. Block 320 comprises generating a report identifying the intersections from block 315. Block 325 comprises controlling a display to generate the report from block 320. FIG. 5 shows an example performance of block 325 upon performance of block 315 and block 320.

Figure 12:
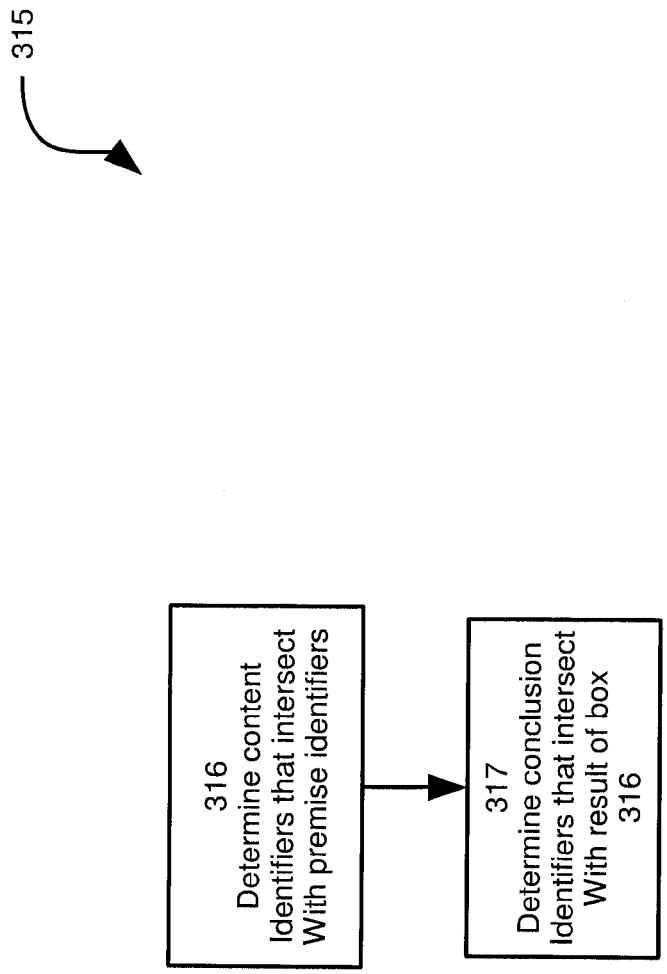
FIG. 12 is a flow-chart showing a non-limiting example of a method to effect one of the blocks of the method of FIG. 11.

It is to be understood that the blocks of FIG. 11 can be effected in a number of ways. As one non-limiting example, FIG. 12 shows a set of blocks that can be used to effect block 315. Block 316 comprises determining content identifiers (i.e. a plurality of identifies representing each unique identifier for particular pieces of content 154a) that intersect with the set of all premise identifiers received at box 305, to thereby create first intersection set. This first intersection set can then be cached in, for example, volatile storage unit 108a or nonvolatile storage unit 104a. Box 317 comprises determining a set of conclusion identifiers that intersects with first intersection set, to create a second intersection set which can also be cached. The second intersection set can then be used to create the report at block 320.

As a further variation, various sets of intersections at block 316 or at block 317, or at both of them, may be pre-calculated in order to reduce processing time. Such pre-calculation can be effected every time additional content 154a' is added, or premise identifiers 158a' are added, deleted or otherwise changed, or conclusion identifiers 162a' are added, deleted, or otherwise changed.

Precalculation and caching can be used provide matching case data nearly instantaneously, present aggregate statistics for the query results, and also allow the system to scale to large numbers of simultaneous users.

It will be understood that the specification is illustrative of the present invention and that other embodiments within the spirit and scope of the invention will suggest themselves to those skilled in the art. All references cited herein are incorporated by reference. While the foregoing provides certain non-limiting example embodiments, it should be understood that combinations, subsets, and variations of the foregoing are contemplated. The monopoly sought is defined by the claims.

The invention claimed is:

1. A method for research database management comprising:
  receiving at a processor data pertaining to a plurality of different items of content, the data for each different item of content comprising at least one identifier for at least one premise pertaining to said item of content selected from a taxonomy of premises and also comprising at least one identifier for at least one conclusion pertaining to said item of content, said conclusion being based on the selected premises;
  generating by said processor a database comprising said data pertaining to said plurality of different items of content; and
  upon receipt of a search request based on one or more of the premises of said taxonomy of premises, generating by said processor a set of records from said database containing the premises in the search request and generating a set of intersections of conclusions within said database that are based on the set of records.

2. The method of claim 1 wherein said content comprises one of legal decisions, business case studies, pharmacological studies, psychological studies, or social science studies.

3. The method of claim 2 wherein said content comprises legal decisions and wherein said at least one premise comprises at least one factor from said legal decision and said at least one conclusion comprises at least one result from said legal decision.

4. The method of claim 1 wherein said content is in HTML format.

5. The method of claim 4 wherein said at least one identifier for the at least one premises is an HTML tags.

6. The method of claim 4 wherein said at least one identifier for the at least one conclusion is HTML metadata.

7. The method of claim 1 further comprising:
  controlling a display to generate a report of said set of intersections.

8. The method of claim 7 wherein said report comprises intersections based on one or more identifier for the at least one conclusion.

9. The method of claim 7 further comprising receiving a selection of one or more of said plurality of content within said intersection and controlling said display to generate a report of said selection.

10. The method of claim 1 further comprising, prior to said receiving step:
  establishing the data by use of at least one taxonomist computing device.

11. A computing device comprising:
  a processor constructed and arranged to receive data pertaining to a plurality of different items of content, the data for each different item of content comprising at least one identifier for at least one premise pertaining to said item of content selected from a taxonomy of premises and also comprising at least one identifier for at least one conclusion pertaining to said item of content, said conclusion being based on the selected premises; and
  a database comprising said data pertaining to said plurality of different items of content; said database being searchable upon receipt of a search request based on one or more of said premises,
  wherein, upon the search request, said processor is constructed and arranged to generate a set of records from said database containing the premises in the search request and generating a set of intersections of conclusions within said database that are based on the set of records.

12. The device of claim 11 in combination with a plurality of said devices connected by a network.

13. The device of claim 11 further comprising at least one taxonomist computing device constructed and arranged to establish the data.

14. The computing device of claim 11 wherein said content comprises legal decisions and wherein said at least one premise comprises at least one factor from said legal decision and said at least one conclusion comprises at least one result from said legal decision.

15. A system comprising:
  a content provider computing device constructed and arranged to provide a plurality of different items of content,
  a taxonomist computing device constructed and arranged to provide data for at least one of said different items of content comprising at least one identifier for at least one premise pertaining to said at least one item of content selected from a taxonomy of premises and also comprising at least one identifier for at least one conclusion pertaining to said at least one item of content based on the selected premises,
  a processor constructed and arranged to receive said data, and
  a database comprising said data pertaining to said plurality of different items of content; said database being searchable upon receipt of a search request based on one or more of said premises,
  wherein, upon the search request, said processor is constructed and arranged to generate a set of records from said database containing the premises in the search request and generating a set of intersections of conclusions within said database that are based on the set of records, and wherein said content provider computing device, said taxonomist computing device, and said processor are connected to each other by a communication network.

16. The system of claim 15 further comprising a display constructed and arranged to display said set of intersections.

17. The system of claim 15 wherein said at least one identifier for the at least one premises is an HTML tag.

18. The system of claim 17 wherein said at least one identifier for the at least one conclusion is HTML metadata.

19. The system of claim 15 wherein said database is adapted to receive said data from a plurality of said taxonomist computing devices.

20. The system of claim 15 wherein said taxonomist computing device is adapted to receive said plurality of different items of content from a plurality of content provider computing devices.

* * * * *